US012774418B2

(12) United States Patent
Clopotel et al.

(10) Patent No.: US 12,774,418 B2
(45) Date of Patent: Oct. 27, 2026

(54) METHODS AND SYSTEMS FOR PRODUCING CRACKING RESISTANT ASPHALT BINDER USING PHASE ANGLE

(71) Applicant: MARATHON PETROLEUM COMPANY LP, Findlay, OH (US)

(72) Inventors: Cristian S. Clopotel, Findlay, OH (US); Brian K. Wilt, Findlay, OH (US); Anas A. Jamrah, Findlay, OH (US); Namon E. Crotty, Findlay, OH (US); Elona Dunaway, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 441 days.

(21) Appl. No.: 18/234,421

(22) Filed: Aug. 16, 2023

(65) Prior Publication Data

US 2024/0409815 A1 Dec. 12, 2024

Related U.S. Application Data

(60) Provisional application No. 63/472,270, filed on Jun. 9, 2023.

(51) Int. Cl.
*C08L 95/00* (2006.01)
*C10C 3/00* (2006.01)
(Continued)

(52) U.S. Cl.
CPC .............. *C10C 3/005* (2013.01); *C08L 95/00* (2013.01); *G01N 1/28* (2013.01); *G01N 11/10* (2013.01)

(58) Field of Classification Search
CPC ........... C10C 3/005; C08L 95/00; G01N 1/28; G01N 11/10; C10G 7/06; C10G 7/12
See application file for complete search history.

(56) References Cited

U.S. PATENT DOCUMENTS 2,027,404 A 1/1936 Small
2,102,124 A 12/1937 Lithgow
(Continued)

FOREIGN PATENT DOCUMENTS

CA 1262976 11/1989
CN 2871674 2/2007
(Continued)

OTHER PUBLICATIONS

Acromag, Whitepaper: Introduction to the Two-Wire Transmitter and the 4-20MA Current Loop, Nov. 8, 2010, available at http://www.automation.com/pdf-articles/Acromag-Intro-TwoWire-Transmitters-4-20mA-Current-Loop-904A.pdf.
(Continued)

*Primary Examiner* — Ellen M McAvoy
*Assistant Examiner* — Chantel Graham
(74) *Attorney, Agent, or Firm* — Ray Quinney & Nebeker P.C.; Daniel J. Bezdjian

(57) ABSTRACT

Asphalt binders and methods and systems to produce an asphalt binder that has an increased resistance to fatigue cracking and thermal cracking. In embodiments, a method includes, operating a distillation tower to produce an asphalt binder and transporting the asphalt binder to storage. The method may include determining a phase angle of the asphalt binder. The method may include, in response to the phase angle of the asphalt binder being less than a selected threshold, adding one or more amounts of tower bottoms or gas oil to the asphalt binder to adjust the phase angle of the asphalt binder to and produce a fatigue and thermal cracking resistant asphalt binder and then releasing the asphalt binder from the storage. The method may include testing a sample of the asphalt binder aged for a selected number of hours in a pressure aging vessel to confirm the asphalt binder meets specification requirements.

35 Claims, 11 Drawing Sheets

(51) Int. Cl.

| | |
|---|---|
| ***G01N 1/28*** | (2006.01) |
| ***G01N 11/10*** | (2006.01) |

(56) References Cited

U.S. PATENT DOCUMENTS

| | | | |
|---|---|---|---|
| 2,290,038 | A | 7/1942 | Folmsbee |
| 2,605,193 | A | 7/1952 | Karll |
| 2,850,436 | A | 9/1958 | Beuther |
| 2,877,129 | A | 3/1959 | Hardman |
| 2,906,635 | A | 9/1959 | Teot |
| 3,047,414 | A | 7/1962 | Katz |
| 3,072,284 | A | 1/1963 | Luhman |
| 3,162,101 | A | 12/1964 | Rostler |
| 3,221,615 | A | 12/1965 | McGovern |
| 3,238,173 | A | 3/1966 | Bailey |
| 3,261,269 | A | 7/1966 | McGovern |
| 3,344,056 | A | 9/1967 | Rostler |
| 3,432,321 | A | 3/1969 | Rostler |
| 3,556,827 | A | 1/1971 | McConnaughay |
| 3,867,111 | A | 2/1975 | Knowles |
| 3,955,416 | A | 5/1976 | Waiwood |
| 3,992,340 | A | 11/1976 | Bonitz |
| 4,064,826 | A | 12/1977 | Pauli |
| 4,073,625 | A | 2/1978 | Kiritani et al. |
| 4,082,823 | A | 4/1978 | Augustine |
| 4,084,915 | A | 4/1978 | Wiseblood |
| 4,112,765 | A | 9/1978 | Hollweck |
| 4,130,474 | A | 12/1978 | Anthony |
| 4,145,322 | A | 3/1979 | Maldonado |
| 4,154,710 | A | 5/1979 | Maldonado |
| 4,162,999 | A | 7/1979 | Bohemen |
| 4,237,052 | A | 12/1980 | Fitoussi |
| 4,242,246 | A | 12/1980 | Maldonado |
| 4,320,788 | A | 3/1982 | Lord |
| 4,323,496 | A | 4/1982 | Mitani |
| 4,330,449 | A | 5/1982 | Maldonado |
| 4,373,961 | A | 2/1983 | Stone |
| 4,392,870 | A | 7/1983 | Chieffo |
| 4,541,735 | A | 9/1985 | Abu-Isa |
| 4,549,834 | A | 10/1985 | Allen |
| 4,554,313 | A | 11/1985 | Hagenbach |
| 4,564,834 | A | 1/1986 | Steele |
| 4,585,816 | A | 4/1986 | Vitkuske |
| 4,647,313 | A | 3/1987 | Clementoni |
| 4,762,565 | A | 8/1988 | Graf |
| 4,789,946 | A | 12/1988 | Sinz |
| 4,971,219 | A | 11/1990 | Dombeck et al. |
| 5,008,653 | A | 4/1991 | Kidd |
| 5,023,282 | A | 6/1991 | Neubert |
| 5,039,342 | A | 8/1991 | Jelling |
| 5,050,603 | A | 9/1991 | Stokes |
| 5,083,870 | A | 1/1992 | Sindelar et al. |
| 5,118,733 | A | 6/1992 | Gelles |
| 5,120,777 | A | 6/1992 | Chaverot |
| 5,177,130 | A | 1/1993 | Beavers |
| 5,180,428 | A | 1/1993 | Koleas |
| 5,234,494 | A | 8/1993 | Sawatzky et al. |
| 5,472,928 | A | 12/1995 | Scheuerman et al. |
| 5,498,327 | A | 3/1996 | Stangeland et al. |
| 5,511,573 | A | 4/1996 | Corte |
| 5,559,166 | A | 9/1996 | Bearden |
| 5,589,057 | A | 12/1996 | Trimble et al. |
| 5,601,697 | A | 2/1997 | Miller |
| 5,660,715 | A | 8/1997 | Trimble et al. |
| 5,681,369 | A | 10/1997 | Osborne |
| 5,766,333 | A | 6/1998 | Lukens |
| 5,816,708 | A | 10/1998 | Urich |
| 5,853,455 | A | 12/1998 | Gibson |
| 5,911,817 | A | 6/1999 | Hayner |
| 5,916,529 | A | 6/1999 | Scheuerman |
| 5,938,130 | A | 8/1999 | Zickell |
| 5,966,311 | A | 10/1999 | Stemporzewski, Jr. |
| 6,001,162 | A | 12/1999 | Hayner |
| 6,015,440 | A | 1/2000 | Noureddini |
| 6,048,447 | A | 4/2000 | Hayner |
| 6,074,128 | A | 6/2000 | Marino |
| 6,083,988 | A | 7/2000 | Becker |
| 6,086,749 | A | 7/2000 | Kramer et al. |
| 6,133,351 | A | 10/2000 | Hayner |
| 6,153,004 | A | 11/2000 | Hayner |
| 6,156,113 | A | 12/2000 | Pasquier |
| 6,174,501 | B1 | 1/2001 | Noureddini |
| 6,203,585 | B1 | 3/2001 | Majerczak |
| 6,214,103 | B1 | 4/2001 | Kitagawa |
| 6,223,789 | B1 | 5/2001 | Koch |
| 6,235,104 | B1 | 5/2001 | Chattopadhyay |
| 6,249,241 | B1 | 6/2001 | Jordan et al. |
| 6,290,152 | B1 | 9/2001 | Zickell |
| 6,318,402 | B1 | 11/2001 | Ladeira |
| 6,336,479 | B1 | 1/2002 | Nanaji |
| 6,348,074 | B2 | 2/2002 | Wenzel |
| 6,352,637 | B1 | 3/2002 | Doolin et al. |
| 6,380,284 | B1 | 4/2002 | Lopez |
| 6,384,112 | B1 | 5/2002 | Boussad |
| 6,394,149 | B1 | 5/2002 | Parsons |
| 6,414,056 | B1 | 7/2002 | Puzic |
| 6,414,066 | B1 | 7/2002 | Lem |
| 6,416,249 | B1 | 7/2002 | Crupi |
| 6,417,421 | B1 | 7/2002 | Yao |
| 6,514,331 | B2 | 2/2003 | Varnadoe et al. |
| 6,514,332 | B2 | 2/2003 | Varnadoe et al. |
| 6,548,580 | B1 | 4/2003 | Rohde |
| 6,575,326 | B2 | 6/2003 | Martin, Jr. |
| 6,615,658 | B2 | 9/2003 | Snelling |
| 6,659,684 | B1 | 12/2003 | Goodhart et al. |
| 6,749,677 | B2 | 6/2004 | Freisthler |
| 6,764,542 | B1 | 7/2004 | Lackey |
| 6,776,832 | B2 | 8/2004 | Spence et al. |
| 6,802,897 | B1 | 10/2004 | Lackey |
| 6,852,779 | B1 | 2/2005 | Planche |
| 6,927,245 | B2 | 8/2005 | Buras et al. |
| 6,932,123 | B1 | 8/2005 | Craig |
| 6,935,387 | B1 | 8/2005 | Blubaugh |
| 6,948,364 | B2 | 9/2005 | Snelling |
| 6,952,996 | B2 | 10/2005 | Sisk et al. |
| 6,973,828 | B2 | 12/2005 | Zimmermann |
| 7,008,670 | B1 | 3/2006 | Freisthler |
| 7,028,382 | B2 | 4/2006 | Fisher |
| 7,041,717 | B2 | 5/2006 | Margulis |
| 7,047,114 | B1 | 5/2006 | Rogers |
| 7,241,821 | B1 | 7/2007 | Hayner et al. |
| 7,297,204 | B2 | 11/2007 | Crews et al. |
| 7,309,390 | B2 | 12/2007 | Falkiewicz |
| 7,357,594 | B2 | 4/2008 | Takamura |
| 7,417,081 | B2 | 8/2008 | Nakajima et al. |
| 7,503,724 | B2 | 3/2009 | Blacklidge |
| 7,568,835 | B2 | 8/2009 | Pils |
| 7,645,114 | B2 | 1/2010 | Cannon et al. |
| 7,753,618 | B2 | 7/2010 | Constantz et al. |
| 7,811,372 | B2 | 10/2010 | Nigen-Chaidron et al. |
| 7,829,053 | B2 | 11/2010 | Constantz et al. |
| 7,848,912 | B2 | 12/2010 | Bertini |
| 7,849,802 | B2 | 12/2010 | Dalrymple |
| 7,918,624 | B2 | 4/2011 | Blacklidge |
| 7,951,857 | B2 | 5/2011 | Crews et al. |
| 7,993,442 | B2 | 8/2011 | Crews et al. |
| 8,026,380 | B2 | 9/2011 | Hassan et al. |
| 8,088,845 | B2 | 1/2012 | Le Clerc et al. |
| 8,133,316 | B2 | 3/2012 | Poncelet et al. |
| 8,193,401 | B2 | 6/2012 | McGehee et al. |
| 8,206,500 | B1 | 6/2012 | Mathis et al. |
| 8,278,451 | B2 | 10/2012 | Becker et al. |
| 8,286,673 | B1 | 10/2012 | Recker et al. |
| 8,316,708 | B2 | 11/2012 | Horst |
| 8,337,117 | B2 | 12/2012 | Vitale et al. |
| 8,404,037 | B2 | 3/2013 | Naidoo et al. |
| 8,454,979 | B2 | 6/2013 | Mitarai et al. |
| 8,562,864 | B2 | 10/2013 | Rodrigues et al. |
| 8,634,970 | B2 | 1/2014 | Lee et al. |
| 8,722,771 | B2 | 5/2014 | Vaidya et al. |
| 8,783,280 | B2 | 7/2014 | Yandle |
| 8,789,564 | B2 | 7/2014 | Jividen et al. |
| 8,814,464 | B2 | 8/2014 | McDade et al. |
| 8,821,064 | B1 | 9/2014 | Morris et al. |

(56) References Cited

U.S. PATENT DOCUMENTS

| | | | |
|---|---|---|---|
| 8,859,649 | B2 | 10/2014 | Ranka |
| 8,926,742 | B2 | 1/2015 | Coe |
| 8,968,457 | B2 | 3/2015 | Payne |
| 8,979,982 | B2 | 3/2015 | Jordan |
| 8,992,118 | B2 | 3/2015 | Coe |
| 9,028,602 | B2 | 5/2015 | Chughtai et al. |
| 9,115,295 | B2 | 8/2015 | Deneuvillers et al. |
| 9,133,581 | B2 | 9/2015 | Devenney et al. |
| 9,139,720 | B2 | 9/2015 | Avramidis et al. |
| 9,139,733 | B2 | 9/2015 | McDade et al. |
| 9,139,953 | B2 | 9/2015 | Ahluwalia |
| 9,150,140 | B2 | 10/2015 | Girard et al. |
| 9,200,205 | B2 | 12/2015 | Bran et al. |
| 9,295,992 | B2 | 3/2016 | Zickell |
| 9,347,187 | B2 | 5/2016 | Coe |
| 9,376,565 | B2 | 6/2016 | Subotic et al. |
| 9,409,336 | B2 | 8/2016 | De Amorim Novais Da Costa Nóbrega et al. |
| 9,416,274 | B2 | 8/2016 | Frank |
| 9,481,794 | B2 | 11/2016 | Cox |
| 9,493,633 | B2 | 11/2016 | Rowland et al. |
| 9,513,135 | B2 | 12/2016 | MacNeille et al. |
| 9,523,003 | B2 | 12/2016 | Williams et al. |
| 9,556,631 | B2 | 1/2017 | Brooks et al. |
| 9,597,628 | B2 | 3/2017 | Kummerer et al. |
| 9,650,580 | B2 | 5/2017 | Merdrignac et al. |
| 9,776,165 | B2 | 10/2017 | Tour et al. |
| 9,790,360 | B2 | 10/2017 | Puchalski et al. |
| 9,862,820 | B2 | 1/2018 | Kim et al. |
| 9,868,855 | B2 | 1/2018 | Merck et al. |
| 9,969,884 | B2 | 5/2018 | Murthy et al. |
| 9,982,136 | B2 | 5/2018 | Cao et al. |
| 10,030,145 | B2 | 7/2018 | Severance et al. |
| 10,076,430 | B2 | 9/2018 | Klausen |
| 10,127,515 | B2 | 11/2018 | Borgerson et al. |
| 10,174,201 | B2 | 1/2019 | Avramidis |
| 10,214,617 | B1 | 2/2019 | Bruns et al. |
| 10,233,120 | B2 | 3/2019 | Flanigan |
| 10,294,616 | B2 | 5/2019 | Crupi et al. |
| 10,316,192 | B2 | 6/2019 | Kurth et al. |
| 10,323,147 | B1 | 6/2019 | Brewster et al. |
| 10,323,148 | B1 | 6/2019 | Brewster et al. |
| 10,329,426 | B2 | 6/2019 | Kurth et al. |
| 10,337,154 | B2 | 7/2019 | Baumrind |
| 10,339,478 | B2 | 7/2019 | Grant et al. |
| 10,363,529 | B1 | 7/2019 | Alberty |
| 10,442,872 | B2 | 10/2019 | Besse et al. |
| 10,449,502 | B2 | 10/2019 | Rovani, Jr. et al. |
| 10,527,547 | B2 | 1/2020 | Hofko et al. |
| 10,570,286 | B2 | 2/2020 | Williams |
| 10,626,050 | B2 | 4/2020 | Muncy et al. |
| 10,626,275 | B2 | 4/2020 | Coe |
| 10,669,203 | B2 | 6/2020 | Franzen et al. |
| 10,669,463 | B2 | 6/2020 | Bahr |
| 10,724,183 | B2 | 7/2020 | Coe |
| 10,767,033 | B2 | 9/2020 | Kluttz et al. |
| 10,793,720 | B2 | 10/2020 | Puchalski et al. |
| 10,794,017 | B2 | 10/2020 | Coe |
| 10,889,940 | B2 | 1/2021 | Crupi |
| 10,961,395 | B2 | 3/2021 | Williams et al. |
| 10,982,097 | B2 | 4/2021 | Larusso et al. |
| 10,988,617 | B2 | 4/2021 | McClellan, Jr. et al. |
| 11,077,045 | B2 | 8/2021 | Sen et al. |
| 11,091,642 | B2 | 8/2021 | Kurth et al. |
| 11,097,981 | B2 | 8/2021 | Reinke et al. |
| 11,124,926 | B2 | 9/2021 | Fennell et al. |
| 11,155,696 | B2 | 10/2021 | Fini |
| 11,193,243 | B2 | 12/2021 | Chesky |
| 11,225,576 | B2 | 1/2022 | Jorda et al. |
| 11,274,208 | B2 | 3/2022 | Colange et al. |
| 11,365,318 | B2 | 6/2022 | Kwon et al. |
| 11,390,750 | B2 | 7/2022 | Baumgardner et al. |
| 11,414,549 | B2 | 8/2022 | Allen et al. |
| 11,421,109 | B2 | 8/2022 | McCurdy et al. |
| 11,427,697 | B2 | 8/2022 | Reinke et al. |
| 11,447,637 | B2 | 9/2022 | Gabel et al. |
| 11,512,437 | B2 | 11/2022 | McDade |
| RE49,447 | E | 3/2023 | Brewster et al. |
| 11,623,990 | B2 | 4/2023 | Baumgardner |
| 11,634,875 | B2 | 4/2023 | Fennell et al. |
| 11,655,419 | B2 | 5/2023 | Nicholson |
| 11,732,108 | B1 | 8/2023 | Hayner |
| 11,814,506 | B2 | 11/2023 | Clopotel et al. |
| 2002/0026884 | A1 | 3/2002 | Raad |
| 2007/0277430 | A1 | 12/2007 | Jackman |
| 2009/0036694 | A1 | 2/2009 | Hassan et al. |
| 2009/0056201 | A1 | 3/2009 | Morgan |
| 2009/0127499 | A1 | 5/2009 | Tran |
| 2009/0137705 | A1 | 5/2009 | Faucon Dumont et al. |
| 2009/0187450 | A1 | 7/2009 | Kocis |
| 2009/0226254 | A1 | 9/2009 | Jones |
| 2010/0020918 | A1 | 1/2010 | Popescu et al. |
| 2010/0034586 | A1 | 2/2010 | Bailey et al. |
| 2010/0048771 | A1 | 2/2010 | Osborn |
| 2010/0062219 | A1 | 3/2010 | Richards |
| 2010/0088142 | A1 | 4/2010 | El-Bakry et al. |
| 2010/0280750 | A1 | 11/2010 | Chen et al. |
| 2010/0289654 | A1 | 11/2010 | Hunter |
| 2011/0105652 | A1 | 5/2011 | Hergenrother |
| 2011/0233105 | A1 | 9/2011 | Bailey |
| 2012/0017804 | A1 | 1/2012 | Venema et al. |
| 2012/0060722 | A1 | 3/2012 | Montpeyroux et al. |
| 2013/0197134 | A1 | 8/2013 | Leal et al. |
| 2013/0276668 | A1 | 10/2013 | Ranka et al. |
| 2013/0344012 | A1 | 12/2013 | Cohen |
| 2014/0270953 | A1 | 9/2014 | Duffy |
| 2014/0284520 | A1 | 9/2014 | Hategan |
| 2014/0310049 | A1 | 10/2014 | Goel |
| 2014/0343192 | A1 | 11/2014 | Cochran et al. |
| 2014/0356526 | A1 | 12/2014 | O'Connell et al. |
| 2015/0012326 | A1 | 1/2015 | Furman |
| 2015/0087753 | A1 | 3/2015 | Koleas et al. |
| 2015/0307013 | A1 | 10/2015 | Tremblay et al. |
| 2015/0324740 | A1 | 11/2015 | Shao |
| 2016/0052169 | A1 | 2/2016 | Baumrind et al. |
| 2016/0122507 | A1 | 5/2016 | Cox |
| 2016/0194581 | A1 | 7/2016 | Phillips |
| 2016/0236980 | A1 | 8/2016 | Mullenbach et al. |
| 2016/0289452 | A1 | 10/2016 | O'Connell et al. |
| 2016/0362338 | A1 | 12/2016 | Reinke et al. |
| 2016/0376440 | A1 | 12/2016 | Naidoo et al. |
| 2017/0096092 | A1 | 4/2017 | Cannon |
| 2017/0107376 | A1 | 4/2017 | Winship et al. |
| 2017/0114281 | A1 | 4/2017 | Gupta et al. |
| 2017/0152384 | A1 | 6/2017 | Eijkenboom |
| 2017/0306570 | A1 | 10/2017 | Crupi et al. |
| 2017/0349725 | A1 | 12/2017 | Broere |
| 2017/0370899 | A1 | 12/2017 | Porot et al. |
| 2018/0010305 | A1 | 1/2018 | Bentaj et al. |
| 2018/0032926 | A1 | 2/2018 | DeLuca |
| 2018/0044529 | A1 | 2/2018 | Kurth et al. |
| 2018/0060808 | A1 | 3/2018 | Borgerson et al. |
| 2018/0112303 | A1 | 4/2018 | Antony |
| 2018/0148575 | A1 | 5/2018 | Kurth et al. |
| 2018/0200264 | A1 | 7/2018 | Blau et al. |
| 2018/0266578 | A1 | 9/2018 | Baxter |
| 2018/0340068 | A1 | 11/2018 | McCurdy et al. |
| 2018/0371251 | A1 | 12/2018 | Avramidis et al. |
| 2019/0016965 | A1 | 1/2019 | Aldous |
| 2019/0048191 | A1 | 2/2019 | Leon et al. |
| 2019/0153229 | A1 | 5/2019 | Reinke et al. |
| 2019/0300714 | A1 | 10/2019 | Watson et al. |
| 2019/0375940 | A1 | 12/2019 | Franzen et al. |
| 2020/0002538 | A1 | 1/2020 | Wissel et al. |
| 2020/0032063 | A1 | 1/2020 | Lungren et al. |
| 2020/0050202 | A1 | 2/2020 | Suresh |
| 2020/0094924 | A1 | 3/2020 | Gaziotis et al. |
| 2020/0118068 | A1 | 4/2020 | Turetsky et al. |
| 2020/0123449 | A1 | 4/2020 | Nicholson |
| 2020/0165459 | A1 | 5/2020 | Williams et al. |
| 2020/0265377 | A1 | 8/2020 | Al Dhaheri et al. |
| 2020/0277497 | A1 | 9/2020 | Reinke et al. |
| 2020/0317925 | A1 | 10/2020 | Hassan et al. |
| 2020/0332126 | A1 | 10/2020 | Donelson |

(56) References Cited

U.S. PATENT DOCUMENTS

| | | | |
|---|---|---|---|
| 2020/0372375 A1 | 11/2020 | Pathak et al. | |
| 2021/0002484 A1 | 1/2021 | Clopotel | |
| 2021/0017386 A1 | 1/2021 | Reinke et al. | |
| 2021/0054210 A1 | 2/2021 | Hemsley et al. | |
| 2021/0079224 A1 | 3/2021 | Cochran et al. | |
| 2021/0095429 A1 | 4/2021 | Murphy et al. | |
| 2021/0130616 A1* | 5/2021 | Williams ................ | C08L 95/00 |
| 2021/0139374 A1 | 5/2021 | Bruns et al. | |
| 2021/0147751 A1 | 5/2021 | Fini et al. | |
| 2021/0189133 A1 | 6/2021 | Grzybowski | |
| 2021/0214057 A1 | 7/2021 | Tsujimoto | |
| 2021/0230255 A1 | 7/2021 | Amadoro et al. | |
| 2021/0230818 A1 | 7/2021 | Fennell et al. | |
| 2021/0236815 A1 | 8/2021 | Waldstreicher et al. | |
| 2021/0238093 A1 | 8/2021 | Eyster | |
| 2021/0241221 A1 | 8/2021 | Pathak et al. | |
| 2021/0284574 A1 | 9/2021 | Kurth et al. | |
| 2021/0334650 A1 | 10/2021 | Celano | |
| 2021/0338562 A1 | 11/2021 | Akthakul et al. | |
| 2021/0362637 A1 | 11/2021 | Hanis | |
| 2021/0371339 A1 | 12/2021 | Dennis et al. | |
| 2021/0371567 A1 | 12/2021 | Vanderhoof et al. | |
| 2022/0001345 A1 | 1/2022 | Ahn et al. | |
| 2022/0002548 A1 | 1/2022 | Wissel et al. | |
| 2022/0033305 A1 | 2/2022 | Cochran et al. | |
| 2022/0089832 A1 | 3/2022 | Yi et al. | |
| 2022/0101272 A1 | 3/2022 | Sunde et al. | |
| 2022/0106537 A1 | 4/2022 | Aritake et al. | |
| 2022/0112130 A1 | 4/2022 | Williams et al. | |
| 2022/0153645 A1 | 5/2022 | Zhou | |
| 2022/0243066 A1 | 8/2022 | Noel | |
| 2022/0267602 A1 | 8/2022 | Cooley et al. | |
| 2022/0281212 A1 | 9/2022 | Bhattacharya et al. | |
| 2022/0315766 A1 | 10/2022 | Baumgardner et al. | |
| 2022/0372257 A1 | 11/2022 | Coe | |
| 2022/0389669 A1 | 12/2022 | Miller | |
| 2022/0402819 A1 | 12/2022 | Mangel et al. | |
| 2023/0033496 A1 | 2/2023 | Townsend et al. | |
| 2023/0072410 A1 | 3/2023 | Inoubli et al. | |
| 2023/0085865 A1 | 3/2023 | Bruns et al. | |
| 2023/0086227 A1 | 3/2023 | Bruns et al. | |
| 2023/0092077 A1 | 3/2023 | Lorenzen et al. | |
| 2023/0348723 A1 | 11/2023 | Clopotel et al. | |

FOREIGN PATENT DOCUMENTS

| | | | |
|---|---|---|---|
| CN | 106934143 | A | 7/2017 |
| CN | 206917912 | | 1/2018 |
| CN | 111879637 | A | 11/2020 |
| CN | 111986520 | A | 11/2020 |
| CN | 113110464 | A | 7/2021 |
| CN | 113921091 | A | 1/2022 |
| CN | 114112889 | A | 3/2022 |
| CN | 114113552 | A | 3/2022 |
| DE | 4124142 | A1 | 1/1993 |
| DE | 9213661 | | 1/1993 |
| DE | 19519539 | A1 | 12/1995 |
| EP | 0870291 | B1 | 10/1998 |
| EP | 2290010 | A1 | 3/2011 |
| EP | 3291206 | A1 | 3/2018 |
| EP | 3441260 | | 2/2019 |
| FR | 2478122 | | 9/1981 |
| GB | 2205104 | A | 11/1988 |
| IN | 293683 | | 3/2018 |
| KR | 10-2017-0011981 | | 2/2017 |
| KR | 101952894 | | 2/2019 |
| KR | 102195378 | B1 | 12/2020 |
| KR | 102597632 | B1 | 11/2023 |
| PL | 157791 | | 7/1992 |
| RU | 1787994 | | 1/1993 |
| RU | 2123719 | C1 | 12/1998 |
| SU | 816996 | A1 | 3/1981 |
| WO | 200055257 | | 9/2000 |
| WO | 2007068461 | A1 | 6/2007 |
| WO | 2009/147360 | | 12/2009 |
| WO | 2011034423 | | 3/2011 |
| WO | 20190234434 | | 12/2019 |
| WO | 2021254815 | A1 | 12/2021 |

OTHER PUBLICATIONS

Dataforth Corporation, Application Note: 4-20 mA Transmitters, May 24, 2002, available at http://www.dataforth.com/catalog/bb/152-138011998.pdf.

Raptor Overfill Protection Probe, TPF, Inc., Jun. 3, 2013, available at http://tpftherm.com/pdf/2TPFB.pdf.

Lee et al. A decision support system for vessel speed decision in maritime logistics using weather archive big data, 2017, Elsevier, Computers and Operations Research 98, 330-342 (Year: 2017).

Torralba A. et al., Paper 132—Smart Navigation System for the Port of Seville, Buenos Aires, Argentina, Sep. 7-11, 2015.

Etienne, Mary et al., Intelligent Maritime Modern Ships and Ports, Dell Technologies and Intel Corporation, May 2020.

Negenborn, Rudy et al., Smart Port, Smart ships and the changing maritime ecosystem, SmartPort, Sep. 2018.

Lind, Mikael et al., Sea Traffic Management—Beneficial for all Maritime Stakeholders, Transportation Research Procedia, Dec. 2016.

Xiao, Yi et al., Digital empowerment for shipping development: a framework for establishing a smart shipping index system, Maritime Policy & Management, Feb. 27, 2021.

Tian Zhe et al., The Development of Key Technologies in Applications of Vessels Connected to the Internet, Symmetry, 2017.

Van Westrenen et al., Maritime traffic management: a need for central coordination?, Springer-Verlag London Limited 2012.

Emco Wheaton, Vapor Transfer Vents, 2020. https://www.gardnerdenver.com/en-us/emcowheaton/fuel-systems/tank-truck-equipment/vapor-transfer-vents.

Sun, Zhaojie et al., Investigation of the potential application of biodiesel by-product as asphalt modifer, Road Materials and Pavement Design 17(3):1-16, Oct. 2015.

Canadian Intellectual Property Office, Examination Report for CA Application No. 3,209,682, Sep. 16, 2024.

* cited by examiner

METHODS AND SYSTEMS FOR PRODUCING CRACKING RESISTANT ASPHALT BINDER USING PHASE ANGLE

CROSS-REFERENCE TO RELATED APPLICATION

The present application claims priority to and the benefit of U.S. Provisional Application No. 63/472,270, filed Jun. 9, 2023, titled "METHODS AND SYSTEMS FOR PRODUCING CRACKING RESISTANT ASPHALT BINDER USING PHASE ANGLE," the disclosure of which is incorporated herein by reference in its entirety.

FIELD OF DISCLOSURE

Embodiments herein generally relate to asphalt binder compositions. More specifically, one or more embodiments relate to asphalt binder compositions, and methods and systems for blending or generating such compositions based on phase angle to produce a fatigue cracking resistant and/or thermal cracking (particularly low temperature thermal cracking) resistant asphalt binder in a less than typical time frame or period.

BACKGROUND

The Superior Performance Asphalt Pavement (Superpave) Performance Grade (PG) asphalt binder specification was introduced in the past as a way to improve asphalt binder properties. Superpave was designed to provide performance related properties that are associated with pavement performance. The objective of the Superpave specifications was to address three pavement distresses or issues: permanent deformation, fatigue cracking, and low temperature thermal cracking. To address these pavement distresses or issues, new equipment was introduced: a dynamic shear rheometer (DSR) was introduced to characterize the asphalt binder properties at high and intermediate temperatures, as well as a bending beam rheometer (BBR) and direct tension (DT) device to characterize the asphalt binder properties at low temperatures.

Two methods for aging of the asphalt binder were introduced: rolling film thin film oven (RTFO) and pressure aging vessel (PAV). Superpave also introduced new specifications to address the above-mentioned distresses. $G^*/\sin(\delta)$ was introduced to characterize the unaged and RTFO aged asphalt binder. $G^*\sin(\delta)$ on the 20 hour PAV aged asphalt binder was introduced to characterize the asphalt binder behavior at intermediate temperatures. Although significant improvements in the asphalt performance were observed, there are several shortcomings with the proposed specification. The first shortcoming is that the current criterion for fatigue cracking is not reliable. The National Cooperative Highway Research Program (NCHRP) 09-59 was initiated to find a better parameter that correlates the asphalt binder fatigue properties to an asphalt blend fatigue performance.

Further, to address thermal cracking, a new parameter, Delta Tc ($\Delta$Tc), was proposed by the Airfield Asphalt Pavement Technology Program (AAPTP), Project 06-01, "Techniques for Prevention and Remediation of Non-Load-Related Distresses on HMA Airport Pavements". The $\Delta$Tc parameter is an indicator of how effectively asphalt binder responds to aging and how incorporation of additives may impact the response of asphalt binder to aging. $\Delta$Tc is represented as the difference in critical low temperature values of asphalt binder according to the Superpave performance grading methodology. $\Delta$Tc is then calculated by subtracting the BBR m-critical temperature at 60 seconds of loading (Tc,m(60 s)), which is the resulting temperature where the m-value is exactly equal to the specification value of 0.300, from the BBR S-critical temperature at 60 seconds of loading (Tc,S(60 s)), which is the resulting temperature where the S-value is exactly equal to the specification value of 300 MPa. The Federal Highway Association (FHWA)-ICT-21-015 Rheology-Chemical Based Procedure to Evaluate Additives/Modifiers Used in Asphalt Binders for Performance Enhancements: Phase 2" suggests a minimum-5 degrees C. for the $\Delta$Tc for an asphalt binder aged in the PAV for 40 hours.

In other words, new specifications utilize or specify testing of a sample of the asphalt binder that has been aged for, at least, 40 hours. Thus, an asphalt binder blending operation, including certification, verification, or confirmation (according to the tests described) and then release of the asphalt binder, takes longer than 40 hours. During such periods, the asphalt binder is stored in a tank or other container and, if the blend does not meet a specification, additional testing may be performed, extending the operation, at the least, another 40 hours.

SUMMARY

Provided here are systems and methods to address these shortcomings of the art and provide other additional or alternative advantages. The disclosure herein provides one or more embodiments of systems and methods for producing or generating an asphalt binder composition with enhanced fatigue cracking resistance and thermal cracking resistance that meets or exceeds an asphalt binder specification specifying tests performed on asphalt binder aged for at least 40 hours. Such production or generation of the asphalt binder may occur in significantly shorter time frames than typical processes or operations take.

One proposed replacement for the current binder fatigue parameter in the American Association of State Highway and Transportation Officials (AASHTO) M320 specification is the Glover-Rowe Parameter ($GRP=G^*(\cos\delta)2/\sin\delta$). In embodiments, one proposed limit for the GRP is 5000 kPa. In addition, it is proposed that the updated AASHTO M320 specification also include an allowable range for the Christensen-Anderson R-value ($R=\log(2)\ (\log(S/3{,}000)/\log(1-m))$) of 1.5 to 2.5. Both tests may be conducted on RTFO and 20-hour PAV aged binders.

Further, it was discovered that there is strong correlation between the GRP and the phase angle of, in an embodiment, the PG 64-22 asphalt binder aged for 20 hours in the PAV when tested at, in embodiments, 25 degrees C. Further still, it was discovered that an asphalt binder or composition that has a phase angle of a minimum of about 44 degrees will pass the newly proposed parameters. Additionally, for PG 64-22, a very strong correlation was discovered between the phase angle measured at 25 degrees C. on the 20 hour PAV aged asphalt binder and 20 hour PAV $\Delta$Tc. For PG 58-28, a good correlation was observed between the phase angle measured at 19 degrees C. on the 20 hour PAV aged asphalt and 20 hour PAV $\Delta$Tc.

In other words, determining the phase angle using a 20 hour aged asphalt binder sample provides a strong correlation and indication as to whether an asphalt binder will meet or exceed parameters of an asphalt binder specification specifying a 40 hour aged asphalt binder sample. Such a correlation and indication may be utilized during asphalt binder production to adjust an asphalt binder blend. After adjusting an asphalt binder blend, the phase angle may be determined again using another 20 hour aged sample. Such a process may be iterative, for example, blending may occur, followed by testing then adjustment, until a phase angle threshold is reached. Using such processes and operations, an asphalt binder may be produced faster and more economically, as the time to produce such an asphalt binder may be reduced significantly. After the asphalt binder is produced and released for further use, the asphalt binder may be certified, verified, or confirmed (or otherwise determined to meet or exceed parameters in the asphalt binder specification) using a 40 hour aged sample of the asphalt binder according to specification requirements.

Accordingly, an embodiment of the disclosure is directed to a method for producing an asphalt binder that has an increased resistance to fatigue cracking and thermal cracking. The method may include selecting one or more of a feedstock for atmospheric distillation via an atmospheric distillation tower. The method may include operating the atmospheric distillation tower to produce a residuum having asphaltic content. The method may include transporting the residuum to a vacuum distillation tower. The method may include operating the vacuum distillation tower to produce an asphalt binder. The method may include transporting the asphalt binder to storage. The method may include determining, based on results of a test conducted on a sample of the asphalt binder aged for a first selected number of hours, a phase angle of the asphalt binder. The method may include, in response to the phase angle of the asphalt binder being less than a selected threshold phase angle, (a) adding one or more amounts of tower bottoms or gas oil to the asphalt binder, thereby to adjust the phase angle of the asphalt binder to equal or exceed the selected threshold phase angle and produce a fatigue cracking resistant and thermal cracking resistant asphalt binder; (b) releasing at least a portion of the asphalt binder from the storage; and (c) testing a sample of the at least a portion of the asphalt binder aged for a second selected number of hours in a pressure aging vessel, thereby to confirm the asphalt binder meets specification requirements for further use. The second selected number of hours may be greater or substantially greater than the first selected number of hours.

In an embodiment, the first selected number of hours may comprise about 20 hours and the second selected number of hours may comprise about 40 hours. The determination of the phase angle of the asphalt binder may include aging an asphalt binder sample of the asphalt binder for 20 hours in the pressure aging vessel, thereby to define a 20 hour aged asphalt binder sample. The determination of the phase angle may include applying the 20 hour aged asphalt binder sample to a dynamic shear rheometer at a selected temperature. The determination of the phase angle may include operating the dynamic shear rheometer at the selected temperature to determine the phase angle of the asphalt binder at the selected temperature. The selected temperature may comprise a temperature specified in a performance graded specification. The selected temperature may include a temperature of greater than about 18 degrees Celsius. The greater than about 18 degrees Celsius may comprise one of about 19 degrees Celsius or about 25 degrees Celsius.

In an embodiment, the selected threshold phase angle may comprise one of about 42 degrees, about 44 degrees, about 46 degrees, or about 48 degrees. In another embodiment, the selected threshold phase angle may comprise a phase angle range determined by parameters included in the specification requirements and a correlation between the parameters and the phase angle range. In yet another embodiment, the asphalt binder may meet or exceeds parameters defined in AASHTO M320 for one or more types of performance graded asphalt binder. Types of performance graded asphalt binder may include specifications for asphalt binder utilized in a specified environment. In another embodiment, the type of performance graded asphalt binder may include, but is not limited to, performance graded (PG) 64-22 asphalt binder or PG 58-28 asphalt binder.

In another embodiment, the atmospheric distillation tower may produce the asphalt binder based on a selected viscosity. The selected viscosity may include a viscosity between 1800 poise to about 2500 poise.

Another embodiment of the disclosure is directed to a method to produce a fatigue and a thermal resistant asphalt binder. The method may include selecting a first amount of tower bottoms and a first amount of gas oil. The method may include blending the first amount of tower bottoms and the first amount of gas oil, thereby to define a blend. The method may include determining, based on results of a test of a sample of the blend aged for a first selected number hours, a phase angle of the blend. The method may include, in response to the phase angle of the blend being less than a selected threshold phase angle, blending one or more of a second amount of tower bottoms or a second amount of gas oil with the blend to produce an asphalt binder, so that the asphalt binder being produced has a resistance to one or more of fatigue cracks or thermal cracks as defined in a selected asphalt specification. The method may include releasing the asphalt binder for further use. The method may include testing another sample of the asphalt binder aged for a second selected number of hours in a pressure aging vessel in accordance with the selected asphalt specification, thereby to confirm the asphalt binder meets the selected asphalt specification. The first selected number of hours may be less than or substantially less than the second selected number of hours.

In another embodiment, the method may include, prior to releasing the asphalt binder, iteratively: (a) determining another phase angle of the asphalt binder and (b) in response to the another phase angle of the asphalt binder being less that the selected threshold phase angle, blending one or more of an additional amount of tower bottoms or an additional amount of gas oil with the asphalt binder to produce an increased phase angle asphalt binder. The release of the asphalt binder may occur when the another phase angle of the asphalt binder exceeds the selected threshold phase angle.

In another embodiment, the selected threshold phase angle comprises a phase angle modeled with a plurality of 20 hour pressure aged asphalt binder samples, a plurality of 40 hour pressure aged asphalt binder samples, and/or rolling thin film oven aged asphalt binder samples, each with varying phase angles, tested via a dynamic shear rheometer to determine a Glover-Rowe Parameter (GRP), a Christensen-Anderson R-value, and a Delta Tc of each.

Another embodiment of the disclosure is directed to a method to produce a fatigue and a thermal resistant an asphalt binder. The method may include, during asphalt binder production, (a) selecting a first amount of tower bottoms, (b) selecting a first amount of gas oil, and (c) blending the first amount of tower bottoms and the first amount of gas oil, thereby to define a blend. The method may include determining, based on results from a test on a sample of the blend aged fora selected time less than that specified in an asphalt specification, a phase angle of the blend via a first test. The method may include, in response to the phase angle of the blend being less than a selected threshold phase angle, blending a second amount of gas oil with the blend to produce the asphalt binder, so that the asphalt binder produced therefrom has a resistance to one or more of fatigue cracks or thermal cracks.

In an embodiment, the phase angle indicates that the blend meets or exceeds parameters of a selected asphalt specification determined via a second test in a second selected time specified in the asphalt specification. Further, the selected time comprises a time substantially less than second selected time.

In another embodiment, the first test may include obtaining a sample of the blend and processing the sample in a dynamic shear rheometer at a specified temperature, and wherein the specified temperature comprises about 18 degrees Celsius or greater. Further, prior to processing the sample, the first test may include aging the sample in a pressure aging vessel for a specified time at a second specified temperature. The specified time includes about 20 hours. In another embodiment, the method may include determining a cold temperature asphalt binder performance model based on one or more of the phase angle of the blend, results of aging the blend, or a viscosity of the blend.

In an embodiment, the selected threshold phase angle may include one of about 44 degrees, about 46 degrees, or about 48 degrees. In another embodiment, the resistance to one or more of fatigue cracks or thermal cracks of the blend meets or exceeds one of a performance graded (PG) 58-28 asphalt specification or PG 64-22 asphalt specification.

Another embodiment of the disclosure is directed to a method to test an asphalt binder under test at a refinery. The method may include transporting a portion of an asphalt binder as an asphalt binder under test from one or more of a distillation tower, blending device, or storage to a testing apparatus. The method may include aging the asphalt binder under test for a first period of time in a pressure aging vessel to define an aged asphalt binder under test. The method may include determining, in a selected time less than a test time specified in an asphalt specification, a phase angle of the aged asphalt binder under test via a dynamic shear rheometer. The method may include, in response to the phase angle being within a selected range, releasing the asphalt binder for further use.

In another embodiment, the method may include, in response to the phase angle being outside of the selected range, blending an amount of one or more of a gas oil or tower bottom with the asphalt binder to produce a new asphalt binder. The method may include transporting a portion of the new asphalt binder as a new asphalt binder under test from one or more of the blending device or the storage to the testing apparatus. The method may include aging the new asphalt binder under test for the first period of time in the pressure aging vessel to define an aged new asphalt binder under test. The method may include determining a phase angle of the aged new asphalt binder under test via the dynamic shear rheometer, in response to the phase angle of the aged new asphalt binder under test In another embodiment, the method may include, subsequent to releasing the asphalt binder for further use, aging the asphalt binder under test for a second period of time in the pressure aging vessel to define an aged new asphalt binder under test. The method may include performing one or more tests on the asphalt binder under test to verify that the asphalt binder meets or exceeds the specification requirements.

Another embodiment of the disclosure is directed to a method to test an asphalt binder under test at a refinery. The method may be performed iteratively while a phase angle of an asphalt binder under test remains outside of a selected threshold. The method may include transporting a portion of an asphalt binder as an asphalt binder under test from one or more of a distillation tower, blending device, or storage to a testing apparatus. The method may include aging the asphalt binder under test for a first period of time in a pressure aging vessel to define an aged asphalt binder under test. The method may include determining a phase angle of the aged asphalt binder under test via a dynamic shear rheometer. The method may include determining whether the asphalt binder meets or exceeds specified requirements based on the phase angle and a selected threshold.

In an embodiment, the method may include, in response to a determination that the asphalt binder meets or exceeds specified requirements based on the phase angle and the selected threshold, releasing the asphalt binder from the storage for further use.

Another embodiment of the disclosure is directed to an asphalt binder resistant to one or more of fatigue cracking or thermal cracking. The asphalt binder may include an amount of tower bottoms produced by processing a selected crude oil via a vacuum distillation tower operation. The asphalt binder may include an amount of gas oil produced by processing the selected crude oil via one or more of the vacuum distillation tower operation or an atmospheric distillation tower operation. The amount of the tower bottoms and the amount of gas oil selected may be based on a selected threshold phase angle and a phase angle of a resulting blend of the amount of the tower bottoms and the amount of gas oil such that if the phase angle is less than a threshold phase angle then one or more of the amount of the tower bottoms or the amount of gas oil are increased to form a composition having an increased one or more of fatigue cracking resistance or thermal cracking resistance. In an embodiment, the phase angle of the resulting blend may be determined in a time substantially less than specified in a selected specification requirement In an embodiment, the amount of gas oil may be increased when the phase angle of the composition falls below one of about 44 degrees, 46 degrees, or 48 degrees.

Another embodiment of the disclosure is directed to a system to produce asphalt binder resistant to fatigue cracking and thermal cracking. The system may include a tower to produce tower bottoms and a first gas oil. The system may include a source of a second gas oil. The system may include a blending device to blend the tower bottoms and one or more of the first gas oil and the second gas oil to produce an asphalt binder composition. The system may include a controller. The controller may be configured to determine the phase angle of the asphalt composition in a time less than that specified in specification requirements. The controller may be configured to, in response to the phase angle being outside of a threshold range, add an amount of one or more of the tower bottoms, the first gas oil, or the second gas oil to the asphalt binder composition to increase the phase angle.

In an embodiment, the controller may be configured to, based on one or more of (a) the amount of one or more of the first gas oil or the second gas oil added to the asphalt binder composition, (b) the amount of tower bottoms added to the asphalt binder composition, (c) an amount of first gas oil in the asphalt binder composition, (d) an amount of the second gas oil in the asphalt binder composition, (e) the phase angle at varying points in an asphalt binder production process, or (f) results of other tests performed on the asphalt binder composition: generate a model to determine cold temperature performance of the asphalt composition.

In an embodiment, the tower may provide the tower bottoms directly to the blending device. In another embodiment, the blending device may include one or more of a blending tank or in-line mixing pipeline. In yet another embodiment, the tower bottoms and the first gas oil may be blended within the tower.

Another embodiment of the disclosure is directed to a system to produce asphalt binder in a relatively shorter time that meets specification requirements. The system may include a source of asphalt binder. The system may include a testing apparatus. The testing apparatus may include a pressure aging vessel to (a) receive a portion of the asphalt binder as an asphalt binder under test and (b) age the asphalt binder under test for a specified time. The testing apparatus may include a dynamic shear rheometer to (a) receive the asphalt binder under test that has been aged for the specified time and (b) generate a phase angle of the asphalt binder under test that has been aged for the specified time. The system may include a controller in signal communication with the testing apparatus. The controller may be configured to (a) provide the specified time to the dynamic shear rheometer based on whether a phase angle has been received and whether the phase angle is within a selected threshold, (b) receive the phase angle of the asphalt binder under test, and (c) determine, based on the phase angle of the asphalt binder under test that has been aged for the specified time, whether the asphalt binder meets the specification requirements.

In an embodiment, the source of the asphalt binder may comprise one or more of a distillation tower, blending device, or storage. The storage may include one or more of a pit, container, or tank. The specified time may comprise a time substantially less than a test time included in the specification requirements These and other features, aspects, and advantages of the disclosure will be apparent from a reading of the following detailed description together with the accompanying drawings, which are briefly described below. The disclosure includes any combination of one or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the disclosure's scope.

DETAILED DESCRIPTION

Figure 1A:
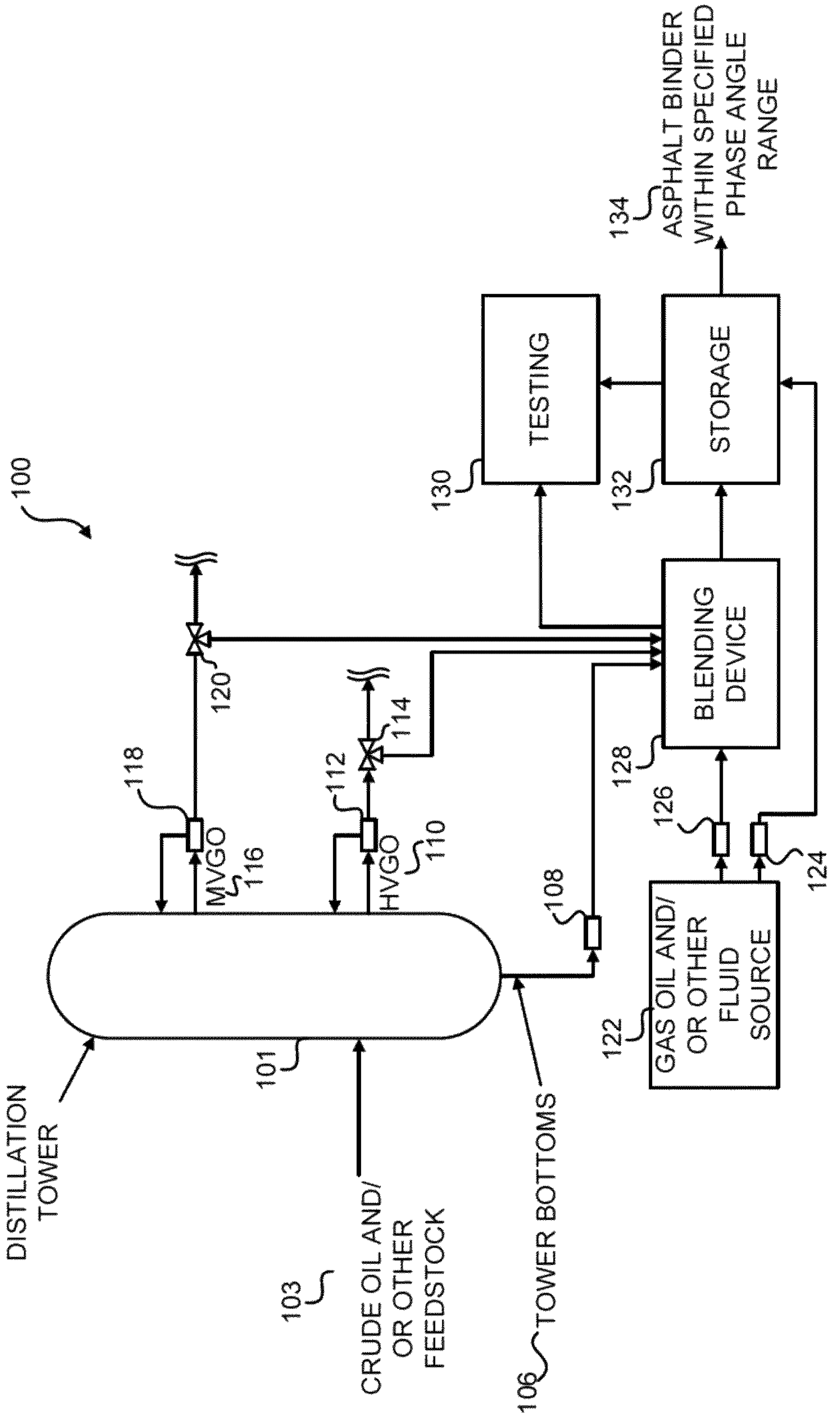
FIG. 1A, FIG. 1B, FIG. 1C, and FIG. 1D are schematic diagrams of a system for producing or generating and/or testing an asphalt composition based on phase angle, according to one or more embodiments disclosed herein.

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the embodiments of the systems and methods disclosed herein and are therefore not to be considered limiting of the scope of the systems and methods disclosed herein as it may include other effective embodiments as well.

The disclosure now will be described more fully hereinafter with reference to specific embodiments and particularly to the various drawings provided herewith. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

As noted, systems and methods are provided here to address these shortcomings of the art and provide other additional or alternative advantages. The disclosure herein provides one or more embodiments of systems and methods for producing or generating an asphalt binder composition with enhanced fatigue cracking resistance and thermal cracking resistance based on phase angle of the asphalt binder composition, including, in embodiment, other properties (for example, viscosity) in a less than typical amount of time. In an example, a typical time to test an asphalt binder exceeds 40 hours (and may significantly greater than 40 hours), due to specifications which note that tests are conducted using 40 hour aged asphalt binder samples. As further noted, one proposed replacement for the current binder fatigue parameter in Association of State Highway and Transportation Officials (AASHTO) M320 is the Glover-Rowe Parameter (GRP=G*(cos δ)2/sin δ). One proposed limit for the GRP is about 5000 kPa. In addition, it is proposed that the updated AASHTO M320 specification also include an allowable range for the Christensen-Anderson R-value (R=log(2) (log(S/3,000)/log(1−m))) of about 1.5 to about 2.5. Both tests may be conducted on RTFO and 20-hour PAV aged binders.

It was discovered that there is a correlation between the GRP and the phase angle of, in an embodiment, the PG 64-22 asphalt binder aged for 20 hour in the PAV when tested at, in embodiments, about 25 degrees C. Further, it was discovered that an asphalt binder or composition that has a phase angle of about 44 degree will pass the newly proposed parameters (which are determined based on an asphalt binder aged for 40 hours). Additionally, for PG 64-22, a strong correlation was discovered between the phase angle measured at about 25 degrees C. on the 20 hour PAV aged asphalt and 20 hour PAV ΔTc. For PG 58-28, a good correlation was observed between the phase angle measured at about 19 degrees C. on the 20 hour PAV aged asphalt and 20 hour PAV ΔTc.

Based on the correlations noted above, as well as similar correlations to other asphalt binder specifications, asphalt binder may be produced and/or released faster and more economically than if a typical 40 hour PAV aged asphalt binder sample were utilized. Typically, such production takes at least 40 hours, in addition to the time utilized for production or generation and/or blending. Using a 20 hour PAV aged asphalt binder sample reduces production and release time by, at the least, 20 hours. In some embodiments, the time to release asphalt may be reduced even further. For example, after each asphalt binder blend adjustment, the phase angle for the asphalt binder blend may be determined again. If many adjustments are made, the time savings for such an operation may be substantial. Finally, asphalt binder may be released with high confidence that the released asphalt binder will pass or will be certified or verified to comply with, meet, or exceed specification requirements (the specification being, in an example, an asphalt or asphalt binder specification, the Superpave specification, a government's specification for asphalt binder, a local government's specification for asphalt binder, or other specification for a particular asphalt binder).

As such and as noted, based on these discoveries and based on the recognized problems, the systems and methods disclosed herein include systems and methods to produce asphalt binder compositions based on a phase angle of the resulting asphalt binder composition. Further, such a composition will exhibit an increased fatigue cracking resistance, an increase thermal cracking resistance, and/or an increased low thermal (such as low ambient temperatures and/or low asphalt temperature) cracking resistance. Such systems and methods may include devices configured to control and adjust amounts of tower bottoms and/or gas oil to be blended based on a measured or determined phase angle and, in some embodiments, additional properties of the asphalt binder composition. Such systems and methods may utilize one or more flow control devices for such adjustments, such as pumps, valves, control valves, and/or other devices configured to control flow of potentially high viscosity and other types of fluids. Further, data illustrated in FIG. 4A through FIG. 4E, and discussed in detail below, shows the benefit of such adjustments based on the phase angle.

Figure 1B:
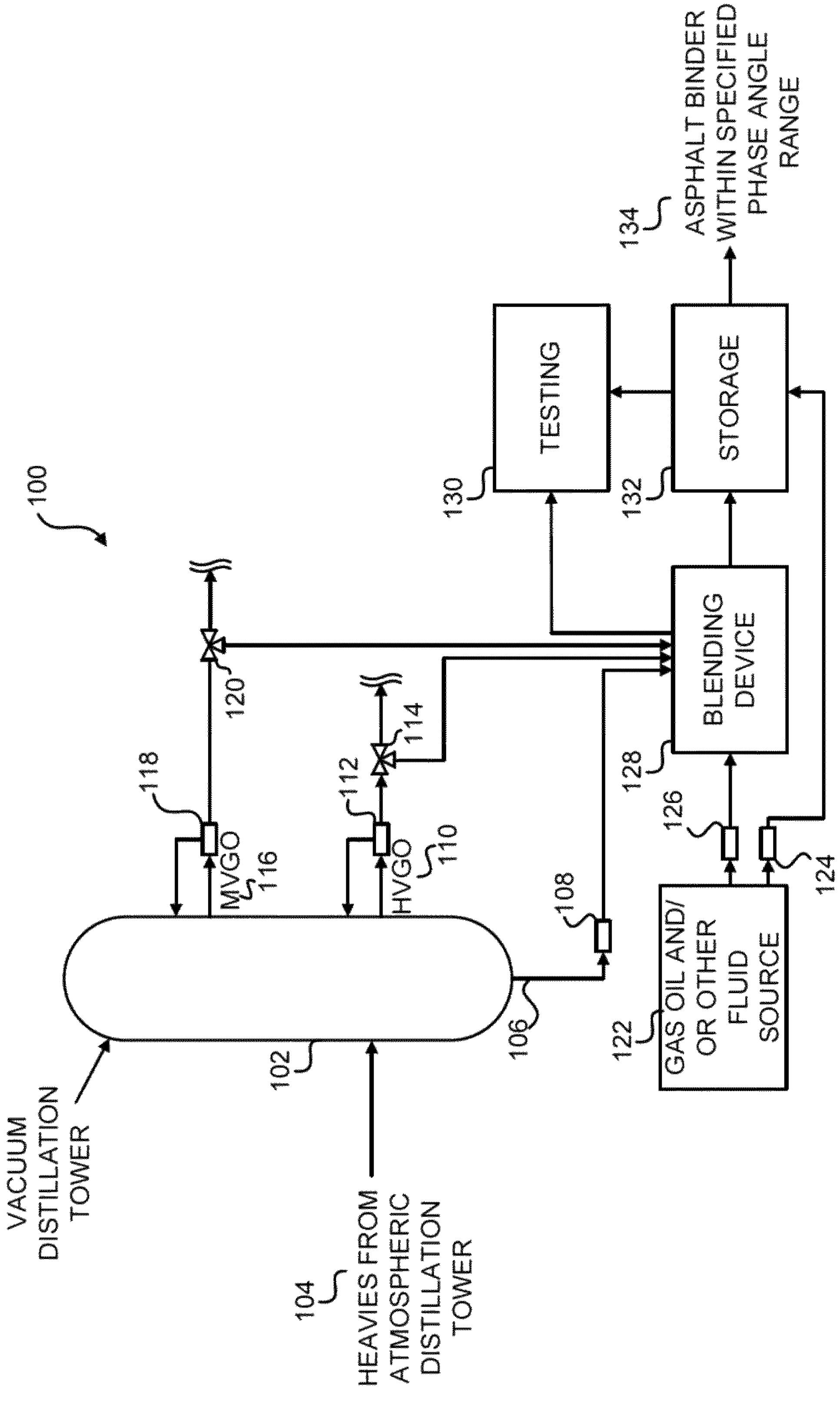
Figure 1C:
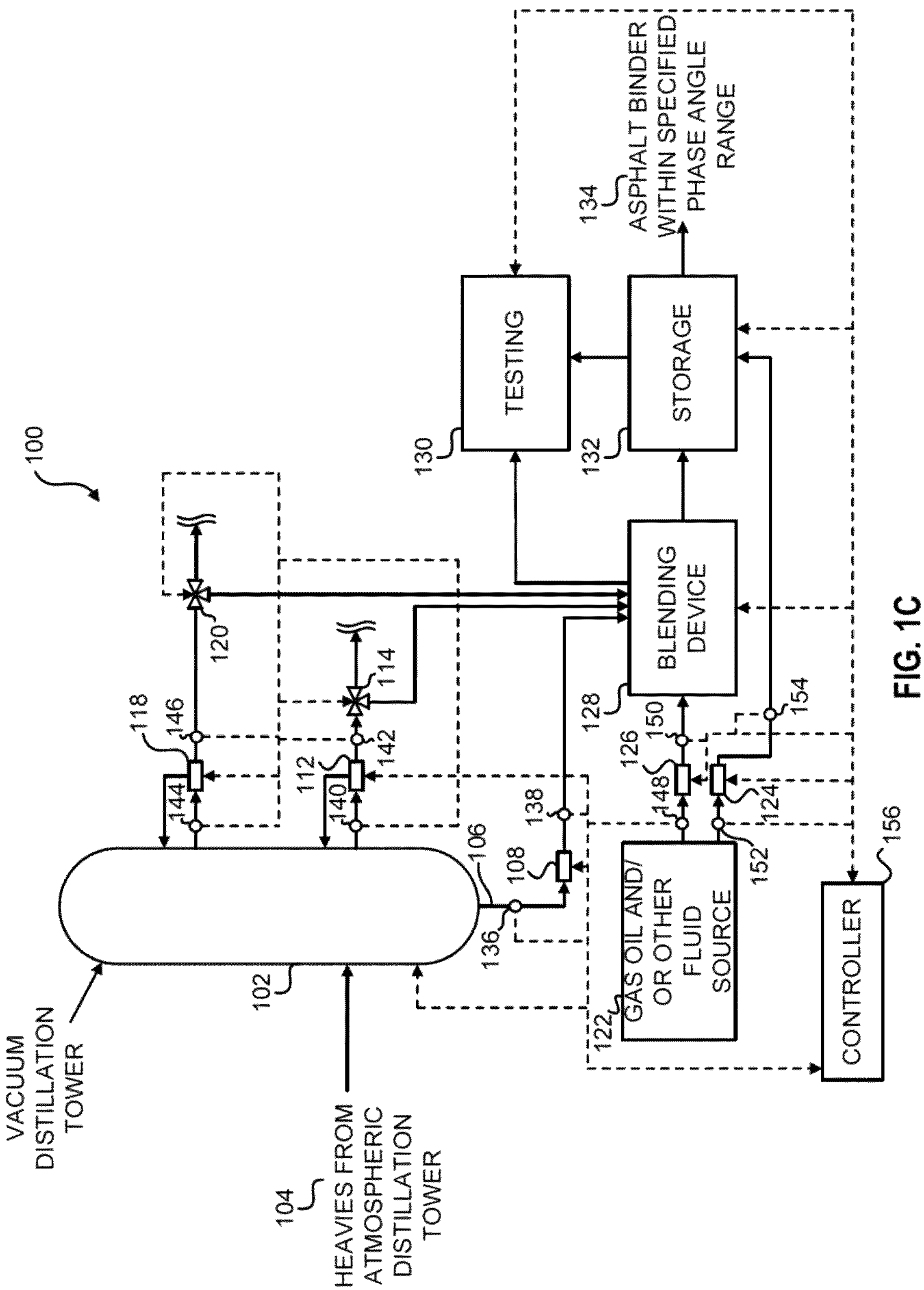

FIG. 1A, FIG. 1B, and FIG. 1C are schematic diagrams of systems 100 for producing or generating an asphalt binder composition based on phase angle, according to one or more embodiments disclosed herein. Turning first to FIG. 1A, the system 100 may include a tower or a distillation tower 101, such as a vacuum tower or vacuum distillation tower and/or an atmospheric tower or atmospheric distillation tower. The distillation tower 101 may receive a hydrocarbon, crude oil, and/or feedstock 103 and process (for example via distillation) the received hydrocarbon, crude oil, and/or feedstock 103 to produce a number of products, such as tower bottoms 106, naphtha (light and/or heavy), gas oil, heavy vacuum or atmospheric gas oil (such as HVGO 110), medium vacuum or atmospheric gas oil (such as MVGO 116), resids, and/or other products as will be understood by one skilled in the art. In an embodiment, the hydrocarbon, crude oil, and/or feedstock 103 may be a petroleum based hydrocarbon and/or a renewable feed or feedstock.

In an embodiment, the renewable feed or feedstock (feed and feedstock being used interchangeably) may include plastic-derived pyrolysis oil, plastic-based oil refined via other methods (for example, the other methods including, but not limited to, hydrothermal processing, liquefaction, gasification, catalytic degradation, and/or other methods suitable for generating oil or another fluid from plastic, as will be understood by one skilled in the art), biomass-derived pyrolysis oil, municipal waste-derived pyrolysis oil, vegetable based feedstock, animal fat feedstock, algae oil, or sugar-derived feedstock.

As the distillation tower 101 operates, the distillation tower 101 may produce tower bottoms 106, output at, for example, a lower portion of the distillation tower 101. The tower bottoms 106 may comprise a highly viscous material. The tower bottoms 106 may be utilized, at or separate from a refinery, to produce an asphalt binder or asphalt binder composition. The asphalt binder may be comprised of the tower bottoms and/or an amount of gas oil (such as, MVGO 116 and/or HVGO 110, among other types of gas oil). The gas oil may be produced via the distillation tower 101 and/or obtained from a gas oil and/or other fluid source 122. The gas oil and/or other fluid source 122 may be located proximate or remote from the other components of the system 100 described herein. In an embodiment, all the components of the system 100 may be located at or proximate a refinery. One or more of the different gas oils (such as the MVGO 116, the HVGO 110, and/or gas oil from the gas oil and/or other fluid source 122) may be utilized to generate the asphalt binder based on one or more properties or characteristics desired and/or exhibited by the produced asphalt binder after blending.

The amounts of each of these products or fluids (in other words, the tower bottoms 106, MVGO 116, HVGO 110, and/or gas oil from the gas oil and/or other fluid source 122) may be controlled by one or more control valves 114 and 120 and/or flow control devices 108, 112, 118, 124, and 126. Other flow control devices may be utilized, as well as a controller, as illustrated in FIG. 1C. The products or fluids may be passed or transported to a blending device 128 and combined to produce an asphalt binder. After testing 130 and then, in some embodiments, adjustment of the blend, an asphalt binder within a specified phase angle range 134 may be produced and released (or at least of portion of the asphalt binder released) for further use. The asphalt binder, after release, may then be tested according to specification or asphalt specification requirements for confirmation, verification, and/or certification. In another embodiment, at least the first determination of the phase angle may be determined or occur in a time less than or substantially less than a time specified in specification or asphalt specification requirements (a less than typical time). For example, the first determination (and, in some embodiments, further determinations based on whether the phase angle is within a range or exceeds a threshold) of phase angle may occur in about 20 hours, rather than 40 hours as specified in various asphalt specifications. However, the results of such a shorter time frame test or determination of phase angle may indicate (based on the test parameters and correlation between the results and performance of an asphalt binder) that the produced asphalt binder will meet or exceed specification requirements. Thus, asphalt binder may be produced and released in a substantially shorter time frame.

In another embodiment, the HVGO 110 and/or MVGO 116 (and/or other fluids) may initially be blended with the tower bottoms inside the distillation tower 101. For example, amounts of the HVGO 110 and/or MVGO 116 may be passed or fed back to the distillation tower 101, where the HVGO 110 and/or MVGO 116 may be combined with tower bottoms. In such embodiments, the amount of HVGO 110 and/or MVGO may be controlled via flow control device 112 and/or flow control device 118, respectively. In another embodiment, the HVGO 110 and/or MVGO 116 may fall back down or be collected internally to the distillation tower 101. In yet another embodiment, and as noted herein, the system 100 may include a blending device 128 to blend the HVGO 110 and/or MVGO 116 with the tower bottoms or a combination of internally blended HVGO 110 and/or MVGO 116 and tower bottoms. The amount of HVGO 110 and/or MVGO 116 and tower bottoms (and/or other fluids) may be determined based on one or more factors or parameters, such as viscosity, density, gravity, and/or other properties. Such factors or parameters may be specified in a selected specification or asphalt binder specification.

Figure 1D:
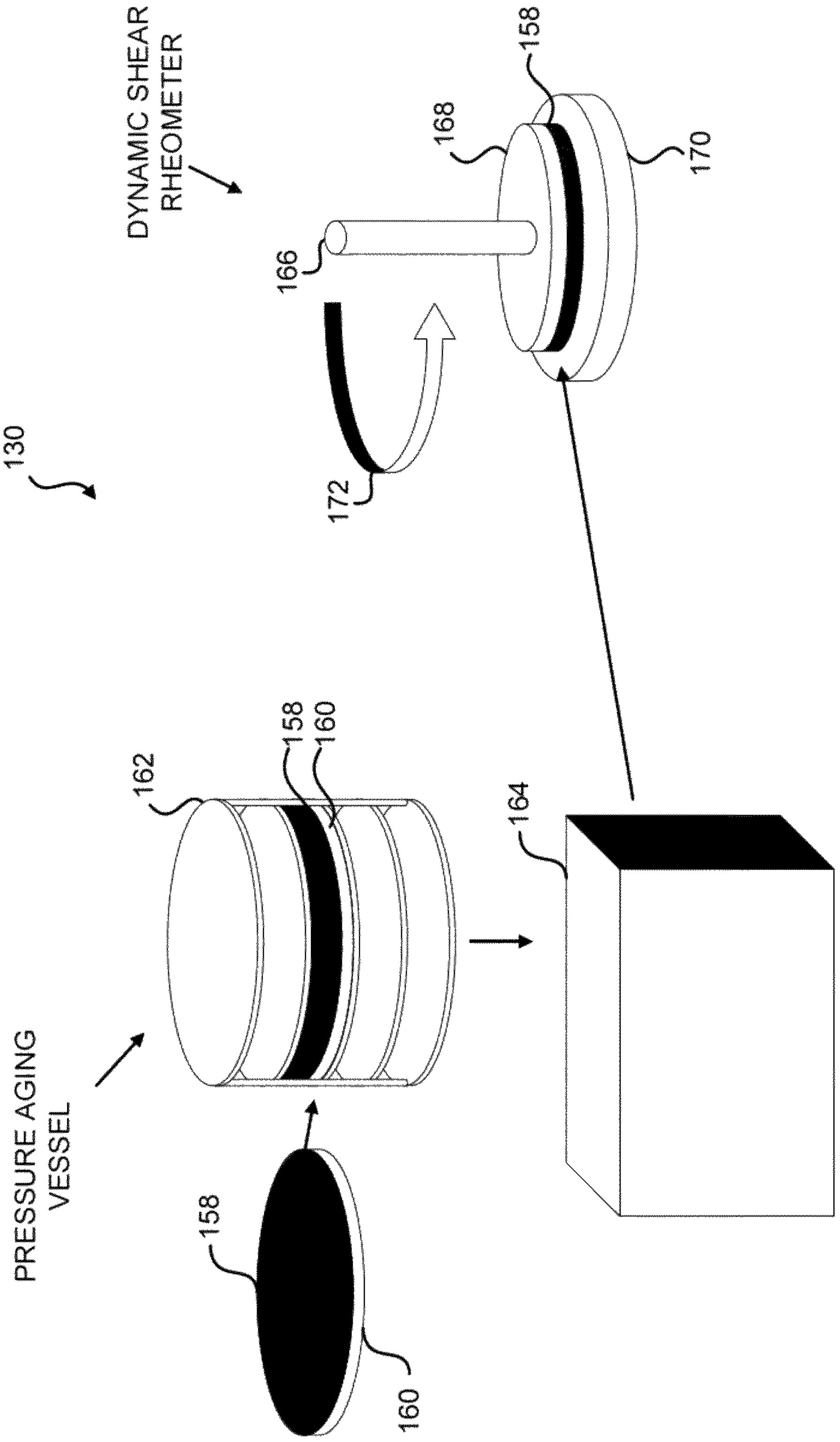

After such a blend is formed, the blend may be tested to determine a phase angle of the blend or mixture, for example at testing 130 (an embodiment of which is described in relation to FIG. 1D). A sample of the blend may be passed or transported to testing 130 directly from the blending device 128 and/or from the storage 132. In an embodiment, after the blend (in other words, the asphalt binder) is produced or generated, the blend may be passed to and stored in storage 132. The storage 132 may include a storage tank, a pit, a blending tank, or container. In an embodiment, the blending device 128 may be a blending tank and, in such an embodiment, the blend may be stored in the blending device 128 during testing.

In an example, an asphalt binder production process may begin with processing a selected or specified hydrocarbon, crude oil, and/or other feedstock 103. The distillation tower 101 may produce tower bottoms 106, MVGO 116, and/or HVGO 110. In an embodiment, a type of asphalt binder and/or an asphalt binder exhibiting specified properties may be preselected, desired, and/or predetermined (for example, based on an input specification and/or based on user input). Based on such preselection's and/or predeterminations, a specified amount of tower bottoms 106 and one or more gas oils may be combined. In another embodiment, the specified amounts of each component may be determined based on past compositions used and/or produced asphalt binder properties. For example, after several asphalt binder production processes, data generated by such processes (such as, properties of asphalt binder produced, whether the asphalt binder was within a specified phase angle range, and/or other exhibited properties) may be utilized to generate a model. The model may suggest or indicate an amount of each component of the composition based on, for example, desired phase angle, product (such as tower bottoms 106 and/or one or more gas oils) availability, and/or other factors. Once the initial amount of each component is utilized or blended, the system 100 may allow for adjustments based on the determined phase angle of the produced asphalt binder.

In embodiments, an analyzer, meter, and/or sensor may determine the viscosity, density, and/or gravity (among other properties) of produced asphalt binder. If the asphalt binder falls within a selected threshold (the threshold, in part, based on user input, past use cases, and/or desired application of the asphalt), then the amount of components (such as tower bottoms 106 and/or one or more gas oils) utilized may be adjusted. Such an adjustment may occur, as noted, via one or more flow control devices, such as valves or control valves (such as control valves 114 and 120), as illustrated in FIG. 1A. The flow control devices may, in addition to or, in another embodiment, rather than including valves or control valves, include pumps and/or other devices or apparatus to control flow of a fluid. After testing 130 to determine the phase angle of the asphalt binder in storage 132, the amount of the tower bottoms, gas oil, and/or other fluids may be added to the blend or mixture. Such an addition may be added to storage 132 via the blending device 128 and/or directly to storage 132. In another embodiment, storage 132 may include a blending or mixing element, enabling added fluid to storage 132.

In an embodiment and as illustrated in FIG. 1B, the distillation tower may be a vacuum distillation tower 102. The vacuum distillation tower 102 may receive heavies from an atmospheric distillation tower 104 and/or other fluids from other sources.

In an embodiment, as illustrated in FIG. 1C, the system 100 may include a controller 156 to control such a process or processes described above and herein. Further, the system 100 may include a number of sensors, meters, and/or analyzers to determine various characteristics and/or properties of a corresponding fluid. For example, the controller 156 may determine the phase angle (or, in some embodiments, other characteristics) based on data received by the controller from testing 130 associated with the produced asphalt binder or may receive the phase angle from the testing 130. In another embodiment, the controller 156 may determine adjustments of various fluids (for example, an amount of the tower bottoms 106 and/or gas oils) based on other factors in addition to phase angle, such as flow rate, pressure, viscosity, and/or individual component characteristics or properties. For example, the controller 156 may receive data corresponding to the one or more components being blended and/or produced by the vacuum distillation tower 102 (such as characteristics or properties of tower bottoms 106 from sensors 136 and/or 138, of HVGO 110 from sensors 140 and/or 142, of MVGO 116 from sensors 144 and/or 146, and/or of gas oil from a gas oil source from sensors 148, 150, 152, and/or 154). Based on these measurements, as well as, in an embodiment, the phase angle of the produced asphalt, the controller 156, may adjust one or more components (for example, via a signal transmitted from controller 156 to one or more flow control devices, such as flow control devices 112, 118, 124, and/or 126) to change the flow of a corresponding fluid.

In an embodiment, the final phase angle of the asphalt binder may be about 44, about 46, or about or at least 48 degrees. In other embodiments, the phase angle may be greater than about 48 degrees. In another embodiment, a selected threshold or selected threshold range at which the controller 156 adjusts or adds an amount of fluid to an asphalt binder may be greater than about 44 degrees to about 80 degrees.

FIG. 1D illustrates a testing apparatus (see testing 130 in FIGS. 1A through 1C) or a portion of a testing apparatus for testing an asphalt binder under test or a sample of an asphalt binder 158. In an embodiment, a portion of asphalt binder (such as the sample of the asphalt binder 158) may be transported to testing 130. Such transportation may occur via piping, pipe, conduits, and/or via capture and transport of a sample by a user. The sample of the asphalt binder 158 (which may also be referred to as an asphalt under test) may be deposited onto a tray, dish, or disc 160 and then inserted into a sample holder 162. The sample holder 162 may then be inserted or placed into a pressure aging vessel 164. The pressure aging vessel 164 may include various components, such as a temperature controller (for cooling and/or heating) and/or an interface. The interface may be in signal communication with a controller. The controller may be configured to adjust various settings for an aging operation. In another embodiment, the interface may be a user interface with, for example, a display and/or controls (such as knobs, switches, sliders, and/or other similar user based interface options). The various settings may include time (such as the time to age a sample), pressure (the pressure within the pressure aging vessel), and/or temperature (the temperature within the pressure aging vessel). In an embodiment, the controller 156 may control or provide the settings for the pressure aging vessel 164. In such examples, the sample of the asphalt binder 158 may first be tested such that the time to age the sample of the asphalt binder 158 is less than typical or less than in current specification requirements. For example, the first test may include aging the sample of the asphalt binder 158 at a selected temperature for about 20 hours. The selected temperature may include about 15 degrees Celsius to about 30 degrees Celsius. Subsequent tests may utilize the same amount of time or an extended amount of time (per specification requirements and/or depending on whether a resulting asphalt binder exceeds a threshold or is within a threshold range).

Once the sample of the asphalt binder 158 has been aged, the sample may be inserted into a dynamic shear rheometer (a portion of which is illustrated in FIG. 1D). The dynamic shear rheometer may include a base 170 including a slot, notch, niche, or indentation configured to accept an aged sample of the asphalt binder 158. The dynamic shear rheometer may include an armature 166 attached or connected to a disk or plate 168. The armature 166 may be configured to rotate in, for example, a circle or ellipses (as indicated by arrow 172) at a selected frequency, force, and time causing the disk or plate 168 to grind or rub against the aged sample of the asphalt binder 158, thus simulating, for example, wear caused by a vehicle driving over the asphalt binder at a selected speed. Further, the dynamic shear rheometer may operate at a selected temperature. Using the factors noted, the phase angle of the asphalt binder may be determined and communicated, via a user and/or signal communication, to the controller 156. In another embodiment, data from the dynamic shear rheometer may be transmitted or communicated to the controller 156 and then the controller 156 may determine the phase angle of the asphalt binder.

Figure 2:
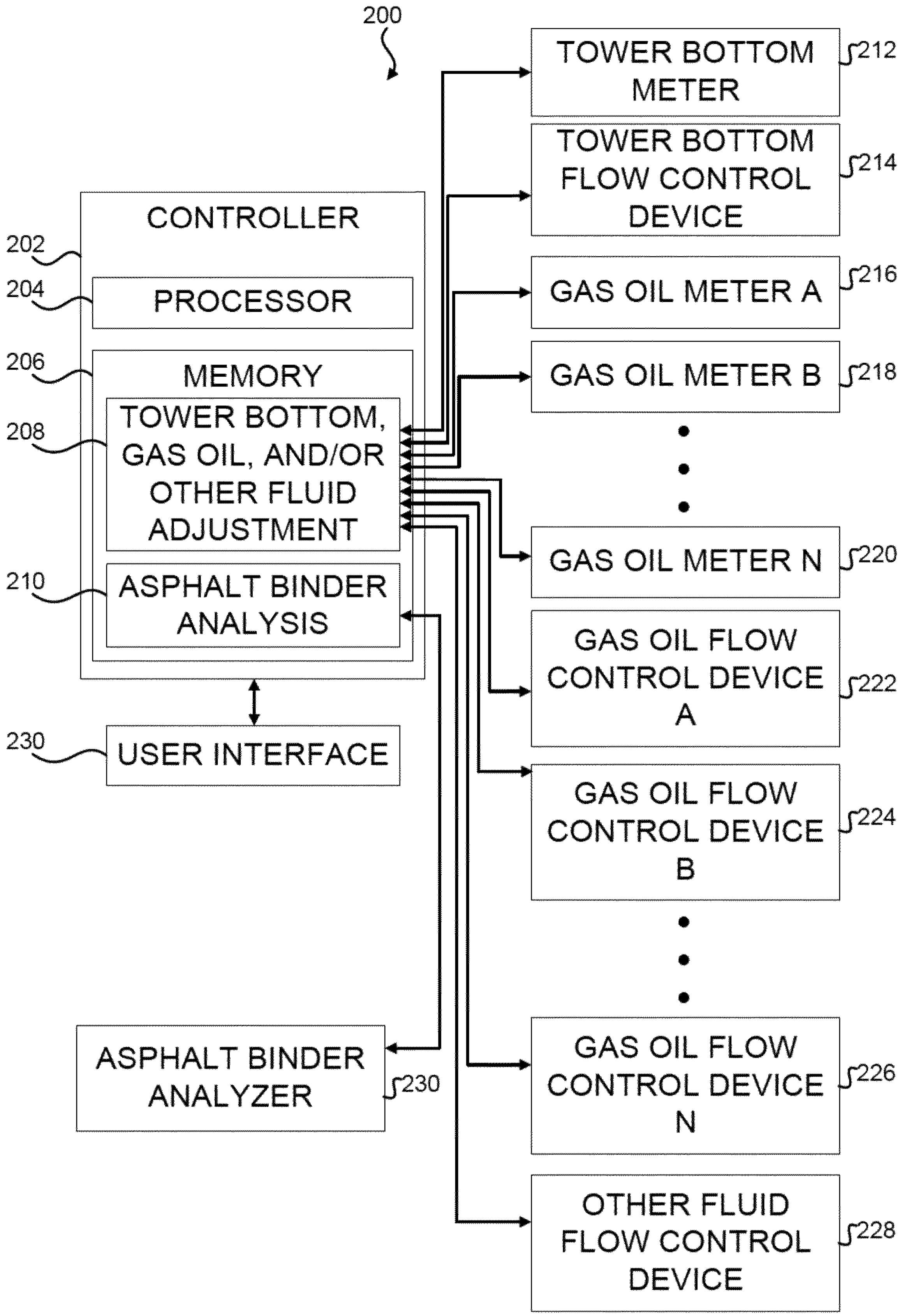
FIG. 2 is a simplified diagram illustrating a control system for managing the blending of components to produce or generate an asphalt based on phase angle, according to one or more embodiments disclosed herein.

FIG. 2 is a simplified diagram illustrating a control system for managing the blending of components to produce or generate an asphalt binder based on phase angle, according to one or more embodiments disclosed herein. In an example, the control system 200 may include a controller 202 or one or more controllers. Further the controller 202 may be in signal communication with various other controllers throughout or external to a refinery or terminal. The controller 202 may be considered a supervisory controller. In another example, a supervisory controller may include the functionality of controller 202 and may control or manage other proximate and/or remote controllers.

Each controller described above and herein may include a machine-readable storage medium (for example, memory 206) and one or more processors (for example, processor 204). As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. The memory 206 may store or include instructions executable by the processor 204. As used herein, a "processor" may include, for example one processor or multiple processors included in a single device or distributed across multiple computing devices. The processor 204 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements that are in signal communication with one another.

The controller 202 may include instructions 208 to adjust the amount of tower bottoms and gas oil in an asphalt binder composition or blend. Initially, the amount of tower bottoms and gas oil may be preset, preselected, predetermined, or input via a user interface 230. In another embodiment, the amount of tower bottoms and gas oil to be blended may initially be arbitrary, based on previous values, and/or based on one or more selected characteristics (such as desired viscosity). In yet another embodiment, the controller 202 may include instructions to generate a model to determine initial amounts of tower bottoms and one or more gas oils. Such instructions may cause the controller 202 to receive or to utilize, when executing such instructions, data from previous asphalt binder operations or processes. Such data may include amounts of tower bottoms and/or amounts of one or more gas oils, adjustments made during the asphalt binder operation or process, the final overall phase angle, and/or other properties determined during the asphalt binder operation. Using this data, the controller 202 may generate a model. Based on the currently available tower bottoms and/or one or more gas oils, the controller 202, using the model, may determine an amount of tower bottoms and an amount of the one or more gas oils for the blend.

The controller 202, after determining amounts for each component, may transmit a signal to corresponding flow control devices to adjust such that the amounts corresponding to the components are achieved. The controller 202, for example, may transmit such signals to a tower bottom flow control device 214 and/or one or more gas oil flow control devices A 222, B 224, and/or C 226 to adjust an amount of the components being blended to produce or generate the asphalt binder. The controller 202 may execute the instructions 208 continuously or periodically. In other words, as new properties are determined (for example, flow rate, pressure, viscosity, phase angle, and/or other properties received from tower bottom meter 212, gas oil meters A 216, B 218, C 220, and/or asphalt analyzer 228), the controller 202 may adjust amounts of the components, based on execution of instructions 208.

The controller 202 may include instructions 210 to determine asphalt binder properties or analyze the asphalt binder to determine properties. Instructions 210 may be executed subsequent to at least a first execution of or parallel with instructions 208. In such an example, the produced asphalt binder or asphalt binder composition may be analyzed via an analyzer, sensor, or meter (such as asphalt analyzer 228) and/or tested via a testing apparatus or device (such as via a pressure aging vessel and dynamic shear rheometer). The results of such an analysis may include the phase angle and, in some embodiments, the viscosity and/or other properties of the asphalt binder. In response to the phase angle not exceeding a selected threshold, the controller 202 may, via execution of instructions 208, adjust the amount of gas oil and/or tower bottoms in the blend. Further, the controller 202 may adjust the amount of gas oil and/or tower bottoms in the blend based on one or more other characteristics.

Figure 3:
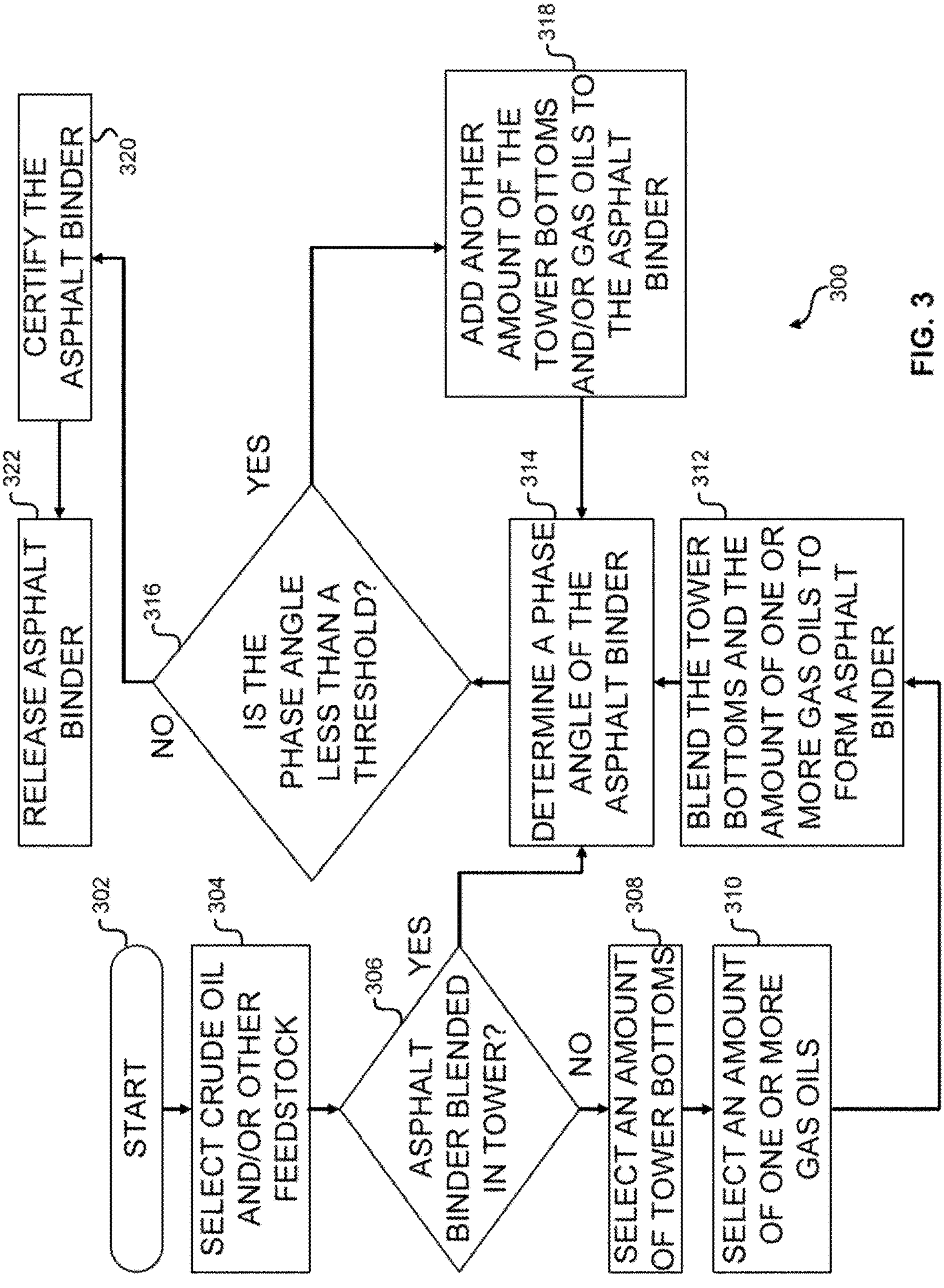
FIG. 3 is a flow diagram for managing the blending of components to produce or generate an asphalt based on phase angle, according to one or more embodiments disclosed herein.

FIG. 3 is a flow diagram for managing the blending of components to produce or generate an asphalt binder based on phase angle and/or viscosity, according to one or more embodiments disclosed herein. The method 300 is detailed with reference to the controller 202 of FIG. 2. Unless otherwise specified, the actions of method 300 may be completed within the controller 202. Specifically, method 300 may be included in one or more programs, protocols, or instructions loaded into the memory of the controller 202 and executed on the processor or one or more processors of the controller 202. The order in which the operations are described is not intended to be construed as a limitation, and any number of the described blocks may be combined in any order and/or in parallel to implement the methods.

At block 302, an asphalt binder blending process may be initiated. A user may enter parameters and/or a specification indicating parameters to begin such a process. In another embodiment, a controller 202 may determine the parameters and automatically initiate the process.

At block 304, the controller 202 and/or a user may select a crude oil and/or feedstock to process. The controller 202 may, in an embodiment, determine which portions of the processed crude oil and/or feedstock to add to a blend based on the type of crude oil and/or feedstock selected.

At block 306, the controller 202 may determine whether the asphalt binder is produced via blending or within a distillation tower. In such an embodiment, the type of blending may be predetermined based on the refinery or configuration of equipment or components at the refinery.

At block 308, if the asphalt binder is not blended within the refinery, the controller 202 and/or a user may select an amount of tower bottoms for the asphalt binder. Such a selection may be based on the type of feedstock selected and/or one or more characteristics of the tower bottoms and/or one or more gas oils, parameters entered, a specification input, and/or other factors (for example, an amount of currently available tower bottoms). At block 310, the controller 202 and/or a user may select an amount of one or more gas oils for the asphalt binder. Such a selection may also be based on the type of feedstock selected and/or one or more characteristics of the tower bottoms and/or one or more gas oils, parameters entered, a specification input, and/or other factors (for example, an amount of currently available tower bottoms).

At block 312, the controller 202 may initiate blending of the tower bottoms and the amount of one or more gas oils. The blending may occur on-site, at a refinery, proximate the tower, proximate a gas oil source, and/or at a remote location. In another embodiment, the tower bottoms may be stored for a period of time prior to blending with gas oil, either on-site where the tower bottoms are produced or at a remote location dedicated to or partially dedicated to blending asphalt binders. Finally, the blending may occur via a blend tank, via an inline blending device or system, and/or some combination thereof.

At block 314, the controller 202 may determine, via an analyzer or testing apparatus or device, the phase angle (and, in another embodiment, other characteristics, such as viscosity) of the asphalt binder after blending. At block 316, if the phase angle and/or viscosity is less than a threshold, the controller 202 may adjust or vary an amount of the tower bottoms and/or one or more of the gas oils.

At block 318, the controller 202, after adjusting the components in the blend or if the phase angle and/or viscosity is greater than or equal to the threshold, may add another amount of one or more of the tower bottoms, one or more gas oils, and/or other fluids to the blend. After the mixture or blend is adjusted, then an updated phase angle may be determined.

At block 320, if the asphalt binder is greater than the threshold or within a threshold range, then the controller 202 may release the asphalt binder for further use. At block 322, the controller 202 may determine whether the asphalt binder meets or exceeds specification requirements (for example, based on testing using a 40 hour aged asphalt binder sample).

FIG. 4A, FIG. 4B, FIG. 4C, FIG. 4D, and FIG. 4E illustrate plots of asphalt binders with various phase angles under various tests, according to one or more embodiments disclosed herein.

Figure 4A:
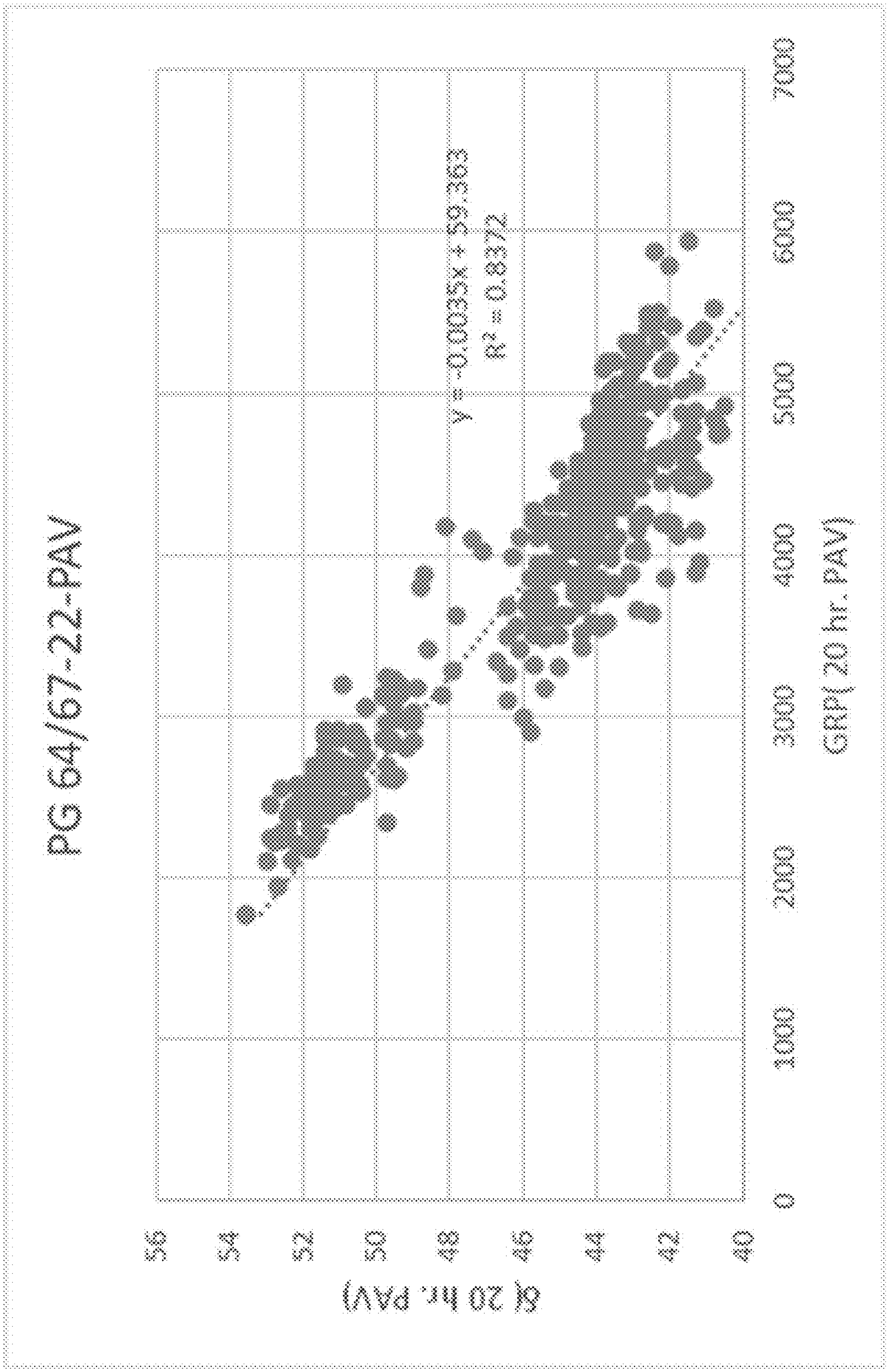
FIG. 4A, FIG. 4B, FIG. 4C, FIG. 4D, and FIG. 4E are plots of asphalts with various phase angles under various tests, according to one or more embodiments disclosed herein.

FIG. 4A shows the relationship between the Glover-Rowe parameter and phase angle for a 20 hr. PAV aged asphalt measured at 25 C. As shown an asphalt binder having a phase angle of a minimum of 42 degrees at 25 C for a 20 hr. PAV aged asphalt will pass the newly proposed GRP (in other words, a limit of about 5000 kPa). Further, asphalt binder with a phase angle of about 41 may, in some embodiments, pass the newly proposed GRP.

Figure 4B:
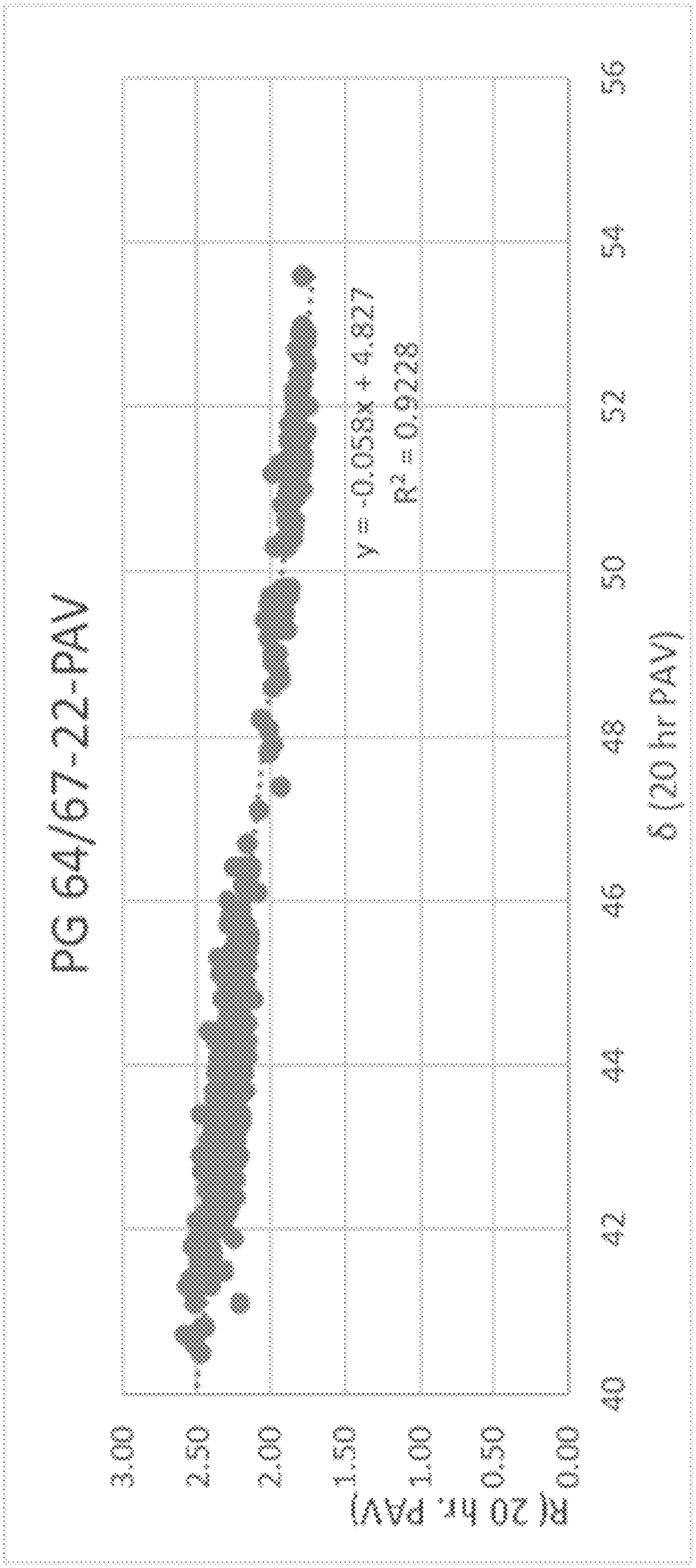

The relationship between phase angle and R parameter is shown in FIG. 4B. As shown in FIG. 4B a very good correlation exists between the phase angle and R, thus an asphalt binder with a phase angle higher than 42 degrees will pass the specifications described herein.

Figure 4C:
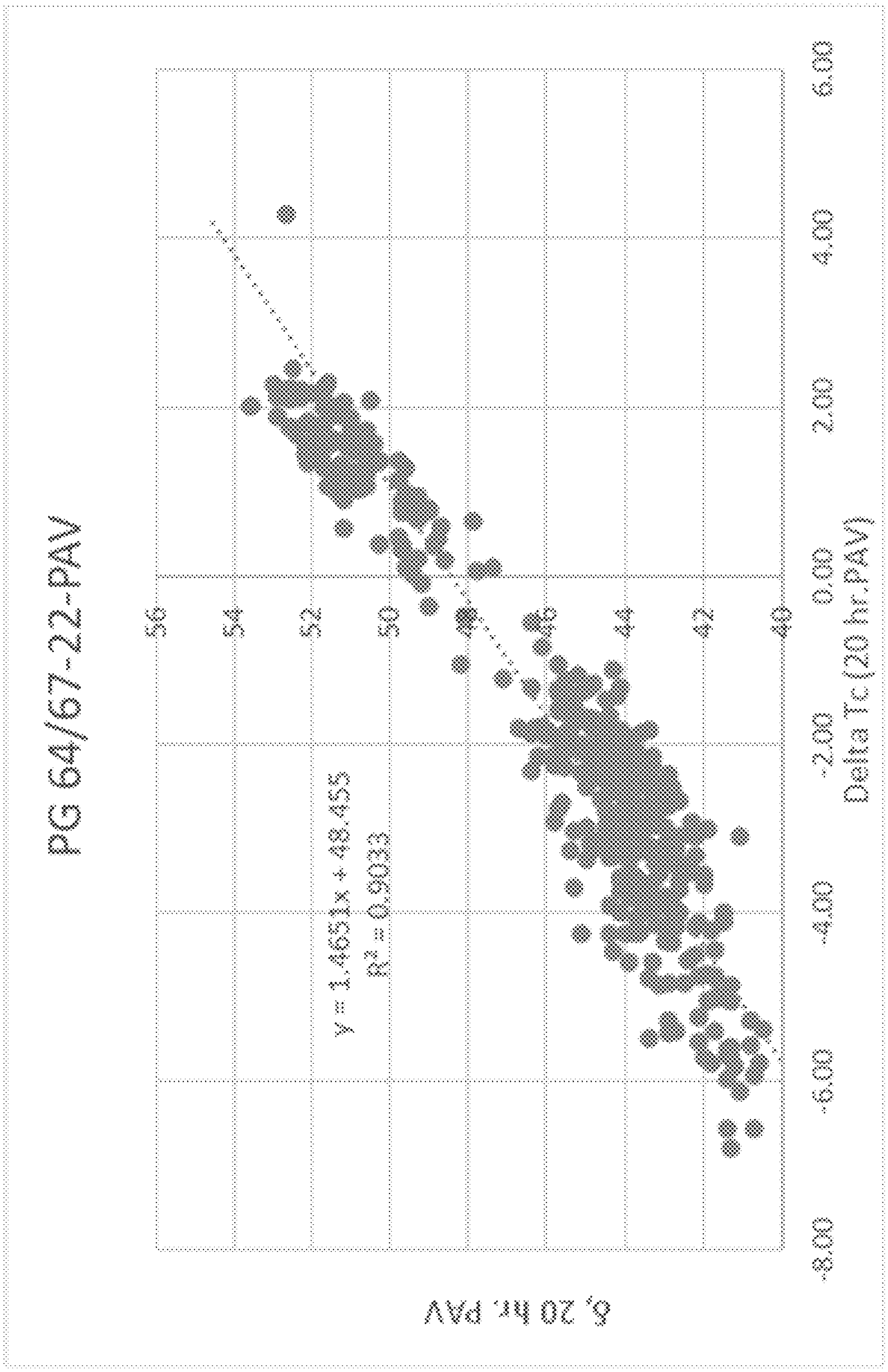

FIG. 4C shows the relationship between the phase angle (measured at 25 C on a 20 hr. PAV asphalt) and the 20 hr. PAV Delta Tc for a PG 64/47-22 asphalt. As shown, a very good correlation exists between these two parameters. Moreover, it is shown that an asphalt binder with a phase angle of 48 degrees will have Delta Tc equal to zero. A similar trend was obtained for a PG 58-28.

Figure 4D:
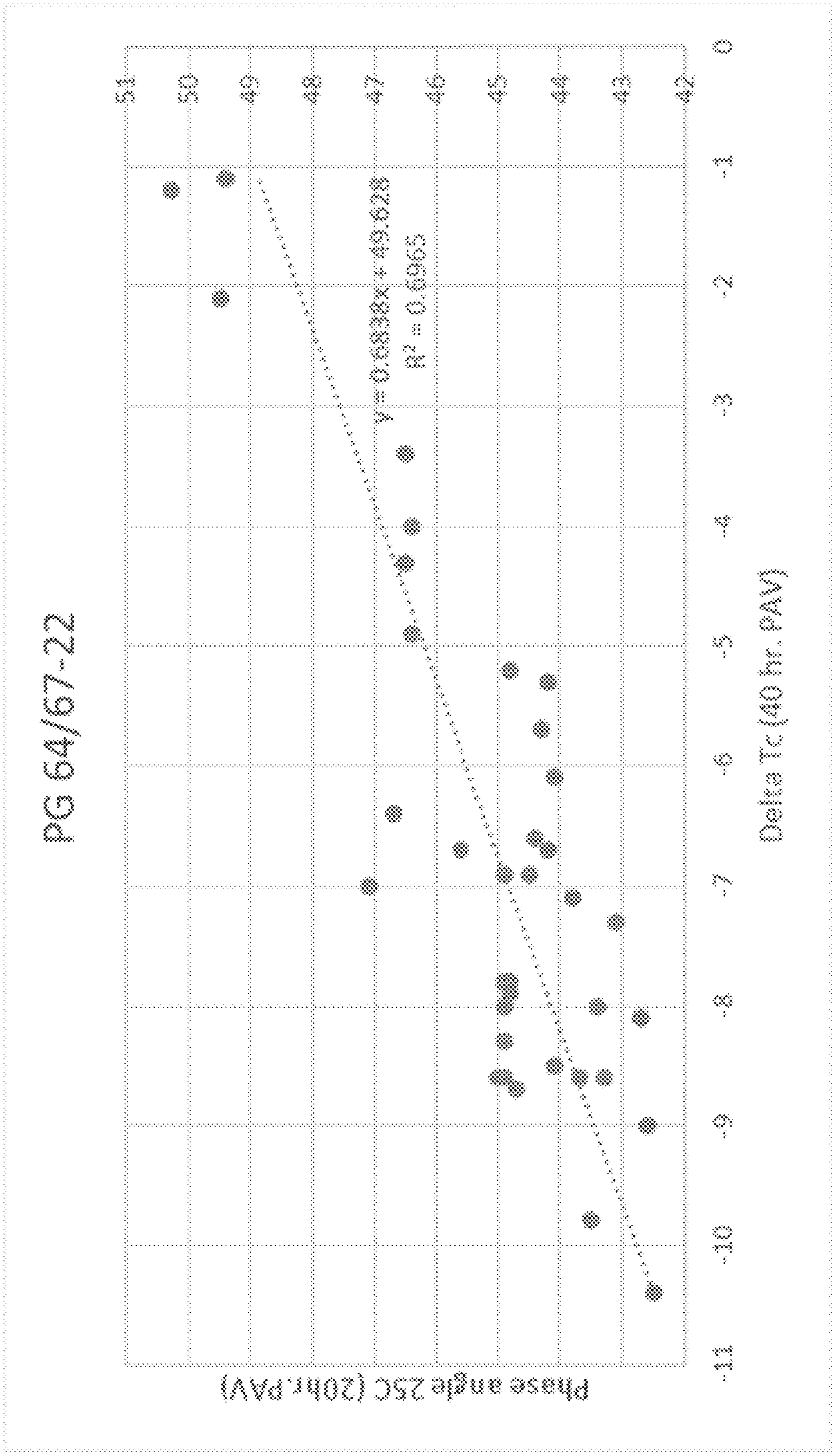

FIG. 4D shows the correlation between the phase angle (measured at 25 C on the 20 hr. PAV aged asphalt) and the Delta Tc (40 hr. PAV). As shown, a good correlation exists between the phase angle and the Delta Tc. Moreover, it is shown that an asphalt with a phase angle of minimum 46 degrees will have a 40 hr. PAV Delta Tc higher than-5C.

Figure 4E:
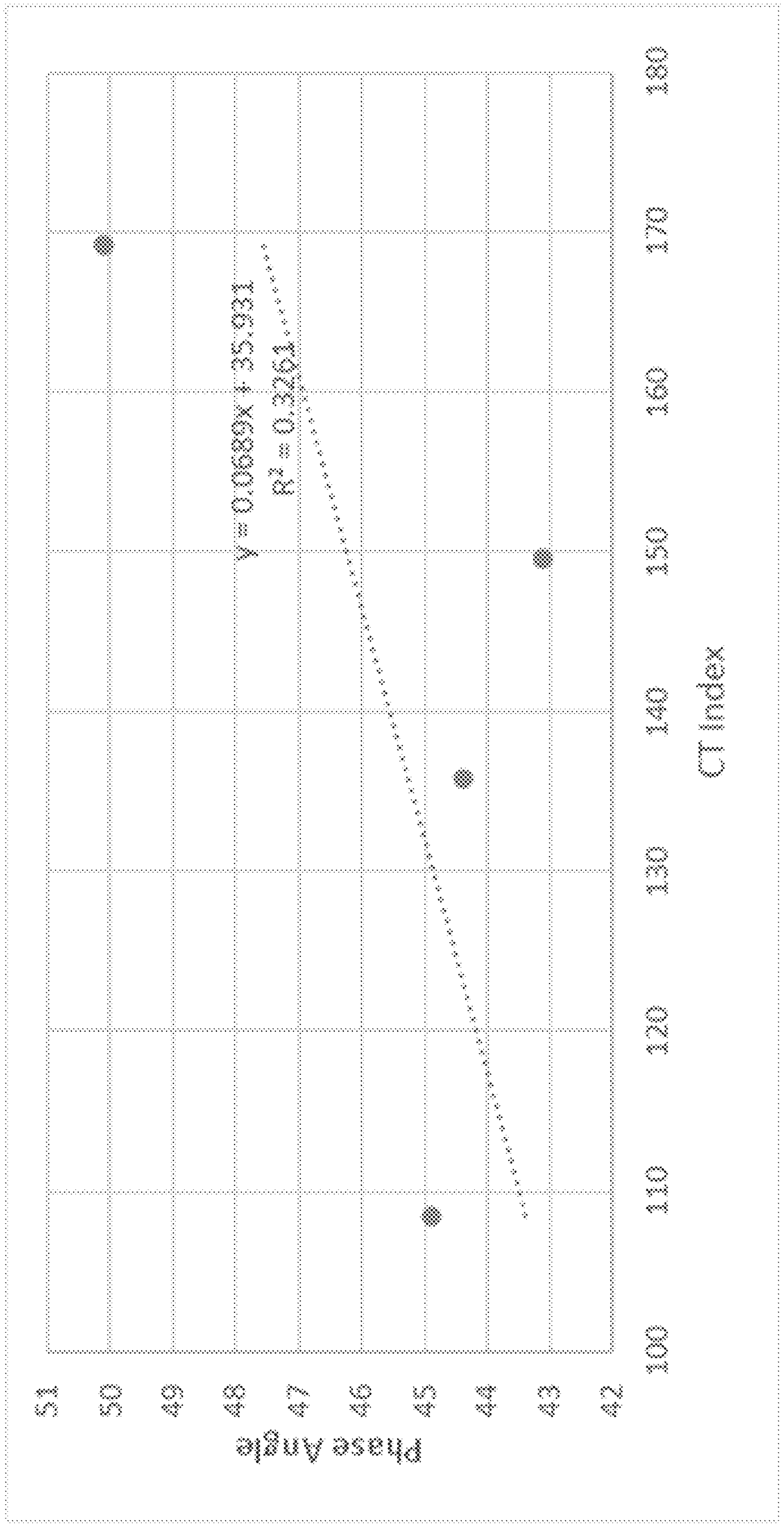

FIG. 4E shows the correlation between the phase angle and CT Index. As shown, mixtures or blends that have a higher CT Index also have a higher phase angle at 25 C for the 20 hr. PAV aged asphalt.

The present application claims priority to and the benefit of U.S. Provisional Application No. 63/472,270, filed Jun. 9, 2023, titled "METHODS AND SYSTEMS FOR PRODUCING CRACKING RESISTANT ASPHALT BINDER USING PHASE ANGLE," the disclosure of which is incorporated herein by reference in its entirety.

In the drawings and specification, several embodiments of asphalt compositions and methods of making such compositions are disclosed that increase the asphalts resistance to fatigue cracking and thermal cracking. Although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A method to produce an asphalt binder that has an increased resistance to fatigue cracking and thermal cracking, the method comprising:
 operating an atmospheric distillation tower to produce a residuum having asphaltic content via atmospheric distillation;
 transporting the residuum to a vacuum distillation tower;
 operating the vacuum distillation tower to produce an asphalt binder;
 transporting the asphalt binder to storage;
 determining, based on results of a test conducted on a sample of the asphalt binder aged for a first selected number of hours, a phase angle of the asphalt binder; and
 in response to the phase angle of the asphalt binder being less than a selected threshold phase angle:
  adding one or more amounts of tower bottoms or gas oil to the asphalt binder, thereby to adjust the phase angle of the asphalt binder to equal or exceed the selected threshold phase angle and produce a fatigue cracking resistant and thermal cracking resistant asphalt binder,
  releasing at least a portion of the asphalt binder from the storage, and
  testing a sample of the at least a portion of the asphalt binder aged for a second selected number of hours in a pressure aging vessel, thereby to confirm the asphalt binder meets specification requirements for further use, the second selected number of hours being greater than the first selected number of hours.

2. The method of claim 1, wherein the first selected number of hours comprises about 20 hours and the second selected number of hours comprises about 40 hours, and wherein determination of the phase angle of the asphalt binder comprises:
 aging an asphalt binder sample of the asphalt binder for 20 hours in the pressure aging vessel, thereby to define a 20 hour aged asphalt binder sample;
 applying the 20 hour aged asphalt binder sample to a dynamic shear rheometer at a selected temperature; and
 operating the dynamic shear rheometer at the selected temperature to determine the phase angle of the asphalt binder at the selected temperature.

3. The method of claim 2, wherein the selected temperature comprises a temperature specified in a performance graded specification, and wherein the selected temperature comprises a temperature of greater than about 18 degrees Celsius, and wherein the greater than about 18 degrees Celsius comprises one of about 19 degrees Celsius or about 25 degrees Celsius.

4. The method of claim 1, wherein the selected threshold phase angle comprises one of about 44 degrees, about 46 degrees, or about 48 degrees.

5. The method of claim 1, wherein the selected threshold phase angle comprises a phase angle range determined by parameters included in the specification requirements and a correlation between the parameters and the phase angle range.

6. The method of claim 1, wherein the asphalt binder meets or exceeds parameters defined in AASHTO M320 for one or more of performance graded (PG) 64-22 asphalt binder or PG 58-28 asphalt binder.

7. The method of claim 1, wherein the atmospheric distillation tower produces the asphalt binder based on a selected viscosity.

8. The method of claim 7, wherein the selected viscosity comprises a viscosity between 1800 poise to about 2500 poise.

9. A method to produce a fatigue and a thermal resistant asphalt binder, the method comprising:
 selecting a first amount of tower bottoms and a first amount of gas oil;
 blending the first amount of tower bottoms and the first amount of gas oil, thereby to define a blend;
 determining a phase angle of the blend based on results of a test of a sample of the blend aged for a first selected number of hours; and
 in response to the phase angle of the blend being less than a selected threshold phase angle:
  blending one or more of a second amount of tower bottoms or a second amount of gas oil with the blend to produce an asphalt binder, so that the asphalt binder being produced has a resistance to one or more of fatigue cracks or thermal cracks as defined in a selected asphalt specification,
  releasing the asphalt binder for further use, and
  testing another sample of the asphalt binder aged for a second selected number of hours in a pressure aging vessel in accordance with the selected asphalt specification, thereby to confirm the asphalt binder meets the selected asphalt specification, the first selected number of hours being less than the second selected number of hours.

10. The method of claim 9, comprising:
 prior to releasing the asphalt binder, iteratively:
  determining another phase angle of the asphalt binder; and
  in response to the another phase angle of the asphalt binder being less than the selected threshold phase angle, blending one or more of an additional amount of tower bottoms or an additional amount of gas oil with the asphalt binder to produce an increased phase angle asphalt binder.

11. The method of claim 10, wherein release of the asphalt binder occurs when the another phase angle of the asphalt binder exceeds the selected threshold phase angle.

12. The method of claim 9, wherein the selected threshold phase angle comprises a phase angle modeled with a plurality of 20 hour pressure aged asphalt binder samples, a plurality of 40 hour pressure aged asphalt binder samples, and/or rolling thin film oven aged asphalt binder samples, each with varying phase angles, tested via one or more of a dynamic shear rheometer or to determine a Glover-Rowe Parameter (GRP), a Christensen-Anderson R-value, and a Delta Tc of each.

13. A method to produce a fatigue and a thermal resistant an asphalt binder, the method comprising:
 (a) during asphalt binder production:
  selecting a first amount of tower bottoms,
  selecting a first amount of gas oil, and
  blending the first amount of tower bottoms and the first amount of gas oil, thereby to define a blend;
 (b) determining, based on results from a test on a sample of the blend aged for a selected time less than that specified in an asphalt specification, a phase angle of the blend via a first test; and
 (c) in response to the phase angle of the blend being less than a selected threshold phase angle, blending a second amount of gas oil with the blend to produce the asphalt binder, so that the asphalt binder produced therefrom has a resistance to one or more of fatigue cracks or thermal cracks.

14. The method of claim 13, wherein the phase angle, determined by the first test exceeding the selected threshold phase angle, indicates that the blend meets or exceeds parameters of a selected asphalt specification determined via a second test in a second selected time specified in the asphalt specification.

15. The method of claim 14, wherein the selected time comprises a time substantially less than second selected time.

16. The method of claim 13, wherein the first test comprises:

obtaining a sample of the blend; and processing the sample in a dynamic shear rheometer at a specified temperature, and wherein the specified temperature comprises about 18 degrees Celsius or greater.

17. The method of claim 16, further comprising, prior to processing the sample:

aging the sample in a pressure aging vessel for a specified time at a second specified temperature, wherein the specified time comprises about 20 hours.

18. The method of claim 17, further comprising:

determining a cold temperature asphalt binder performance model based on one or more of the phase angle of the blend, results of aging the blend, or a viscosity of the blend.

19. The method of claim 13, wherein the selected threshold phase angle comprises one of about 44 degrees, about 46 degrees, or about 48 degrees.

20. The method of claim 13, wherein the resistance to one or more of fatigue cracks or thermal cracks of the blend meets or exceeds one of a performance graded (PG) 58-28 asphalt specification or PG 64-22 asphalt specification.

21. The method of claim 1, wherein:

the selected temperature comprises about 19 degrees Celsius; and determining, based on results of a test conducted on a sample of the asphalt binder aged for a first selected number of hours, a phase angle of the asphalt binder comprises determining the phase angle of the asphalt binder aged for 20 hours in the pressure aging vessel.

22. The method of claim 21, wherein the asphalt binder comprises a PG 58-28 asphalt binder.

23. The method of claim 1, wherein the selected temperature comprises about 25 degrees Celsius; and determining, based on results of a test conducted on a sample of the asphalt binder aged for a first selected number of hours, a phase angle of the asphalt binder comprises determining the phase angle of the asphalt binder aged for 20 hours in the pressure aging vessel.

24. The method of claim 23, wherein the asphalt binder comprises a PG 64-22 asphalt binder.

25. The method of claim 1, wherein:

the selected threshold phase angle is 42 degrees; and the specification requirements comprise a Glover-Rowe Parameter (GRP) less than about 5,000 kPA.

26. The method of claim 25, wherein the selected threshold phase angle is measured at about 25 degrees Celsius.

27. The method of claim 1, wherein:

the selected threshold phase angle is 42 degrees; and the specification requirements comprise a Christensen-Anderson R-value.

28. The method of claim 1, wherein the specification requirements comprise a Delta Tc.

29. The method of claim 1, further comprising prior to releasing at least a portion of the asphalt binder from the storage:

determining another phase angle of the at least a portion of the asphalt binder; and in response to the another phase angle of the asphalt binder being less than the selected threshold phase angle, blending one or more of an additional amount of tower bottoms or gas oil to the asphalt binder.

30. The method of claim 29, wherein releasing at least a portion of the asphalt binder from the storage comprises releasing the at least a portion of the asphalt binder from the storage responsive to the another phase angle exceeds the selected threshold phase angle.

31. The method of claim 1, wherein the asphalt binder comprises gas oil.

32. The method of claim 1, wherein operating the vacuum distillation tower to produce an asphalt binder comprises operating the vacuum distillation tower to produce an asphalt binder comprising the residuum and a gas oil.

33. The method of claim 1, wherein the first selected number of hours is 20 hours.

34. The method of claim 1, wherein the second selected number of hours is 40 hours.

35. The method of claim 17, further comprising determining a cold temperature asphalt binder performance model based on one or more of the phase angle of the blend, results of aging the blend, or a viscosity of the blend.

* * * * *